United States Patent
Potter et al.

(10) Patent No.: US 6,431,289 B1
(45) Date of Patent: Aug. 13, 2002

(54) MULTI-SPEED POWER TOOL TRANSMISSION

(75) Inventors: Christine Potter, Baltimore; Rodney Milbourne, Abingdon, both of MD (US); Todd A. Hagan, Windsor; Michael C. Bowers, Littlestown, both of PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/964,226

(22) Filed: Sep. 26, 2001

Related U.S. Application Data

(60) Provisional application No. 60/263,379, filed on Jan. 23, 2001.

(51) Int. Cl.$^7$ ................................................ F16H 3/74
(52) U.S. Cl. ...................... 173/47; 173/216; 173/217; 475/265; 475/299; 475/320
(58) Field of Search ..................... 173/216, 217, 173/47, 48; 310/47, 50; 475/265, 290, 298, 299, 317, 320

(56) References Cited

U.S. PATENT DOCUMENTS

| | | |
|---|---|---|
| 1,693,139 A | 11/1928 | Dietsche |
| 2,848,908 A | 8/1958 | Hollis |
| 3,774,476 A | 11/1973 | Sohnlein et al. |
| 3,872,742 A | 3/1975 | States |
| 3,901,104 A | 8/1975 | Sims |
| 4,178,813 A | 12/1979 | Smemo |
| 4,366,871 A | 1/1983 | Dieterle et al. |
| 4,651,580 A | 3/1987 | Deane |
| 4,791,833 A | 12/1988 | Sakai et al. |
| 5,339,908 A | 8/1994 | Yokota et al. |
| 5,550,416 A | 8/1996 | Fanchang et al. |
| 5,692,575 A | 12/1997 | Hellstrom |
| 5,897,454 A * | 4/1999 | Cannaliato .................. 475/265 |
| 5,967,934 A | 10/1999 | Ishida et al. |
| 6,086,502 A * | 7/2000 | Chung ........................ 475/299 |
| 6,142,242 A * | 11/2000 | Okumura et al. ........... 173/216 |

FOREIGN PATENT DOCUMENTS

EP   0 787 931 A1   1/1997

\* cited by examiner

*Primary Examiner*—Scott A. Smith
(74) *Attorney, Agent, or Firm*—Harness, Dickey & Pierce, P.L.C.

(57) ABSTRACT

A multi-speed transmission assembly for a rotary power tool. The transmission assembly includes a plurality of transmission stages, with at least two of the transmission stages employing a movable reduction element that permits the transmission stage to be operated in an active mode and an inactive mode. The movable reduction elements are coupled to a switching mechanism that switches the reduction elements in a predetermined manner to provide at least three-gear reduction or speed ratios.

28 Claims, 23 Drawing Sheets

MULTI-SPEED POWER TOOL TRANSMISSION

PRIORITY & CROSS-REFERENCE TO RELATED APPLICATIONS

This application claims the benefit of U.S. Provisional Application No. 60/263,379, filed Jan. 23, 2001. Other features of the present invention are discussed and claimed in commonly assigned copending U.S. application Ser. No. 09/964,028 entitled First Stage Clutch; U.S. application Ser. No. 09/965,108 entitled 360 Degree Clutch Collar; and U.S. application Ser. No. 09/963,905 entitled Housing with Functional Overmold Member.

BACKGROUND OF THE INVENTION

1. Technical Field

The present invention relates generally to power tools such as rotatable drills, power screwdrivers, and rotatable cutting devices. More particularly, the present invention relates to a transmission for a multi-speed transmission for a rotary power tool.

2. Discussion

Modernly, manufacturers of power tools have introduced rotary power tools that have variable speed motors in an attempt to permit the users of these tools with sufficient control over the output speed of the tool so as to permit them to perform diverse operations without resort to additional, specialized tools. Many of the tools that are commercially available include a three-stage, two-speed transmission that permits even greater control over speeds of these tools.

Typically, the known transmission arrangements have lacked a transmission arrangement that could produce a wide range of output speeds and torques that would permit the tool to perform diverse operations such as drilling holes with a large diameter hole saw, installing drywall screws or large diameter lag screws, and performing high-speed drilling operations. The single or dual speed transmissions that were generally employed in these tools typically did not have sufficient speed reducing capacity to permit these transmissions to be diversely employed as configuring these tools for high torque operations tended to impair their high speed performance. Furthermore, the rechargeable batteries that were employed in many of the early cordless rotary power tools were not well suited for use in low-speed, high torque operations due to the amount of energy that is consumed and the rate with which the energy is consumed by the power tool during such operations. Consequently, consumers were often forced to purchase two different rotary power tools, a medium-duty tool for "standard" applications such as drilling and fastening, and a heavy-duty tool having a low-speed, high torque output for more demanding tasks.

With the advent of the modern high capacity, high voltage battery, it is now possible to meet the energy demands of a power tool that is used in low-speed, high torque operations. There remains, however, a need in the art for a power tool transmission having a relatively large range in its speed reducing capacity.

SUMMARY OF THE INVENTION

In one preferred form, the present invention provides a drive train for a power tool. The drive train includes a housing, a transmission and a speed selector mechanism. The transmission has first, second and third reduction gear sets, with two of the reduction gear sets being configured to operate in an active mode for performing a speed reduction and torque multiplication operation and an inactive mode. The speed selector mechanism has a switch portion that is coupled to the housing for movement between first, second and third positions and an actuator portion that is coupled to the transmission. The actuator portion is configured to move two of the reduction gear sets between the active and inactive modes in response to movement of the switch portion between the first, second and third positions.

In another preferred form, the present invention provides a transmission assembly for transmitting torque to an output shaft in a power tool. The transmission assembly includes a housing, a first transmission portion and a second transmission portion. The housing includes a wall member that defines a transmission bore. The first transmission portion has a first input member, a first output member and a first reduction element. The first input member is configured to receive a first intermediate output torque and the first output member configured to output a second intermediate output torque. The first reduction element operable in a first condition wherein the first transmission portion multiplies the first intermediate output torque by a predetermined first amount. The first reduction element further operable in a second condition wherein the first transmission portion multiplies the first intermediate output torque by a predetermined second amount. The second transmission portion includes a second input member, a second output member and a second reduction element. The second input member is configured to receive the second intermediate output torque and the second output member configured to output an output torque to the output shaft. The second reduction element operable in a first condition wherein the second transmission portion multiplies the second intermediate output torque by a predetermined third amount. The second reduction element further operable in a second condition wherein the second transmission portion multiplies the second intermediate output torque by a predetermined fourth amount.

In yet another preferred form, the present invention provides a power tool having a motor and a transmission. The motor has an output shaft and produces an input torque. The transmission assembly has a housing having a wall member that defines a transmission bore and a transmission having first, second and third planetary gear sets. The first planetary gear set has a first ring gear, a first sun gear and a first planet gear assembly. The first planet gear assembly has a first planet carrier and a plurality of first planet gears. The first planet carrier rotatably coupled to the first sun gear. The first planet carrier has a plurality of pinions for rotatably supporting the plurality of first planet gears. The first sun gear is configured to receive the input torque. The first planet carrier includes a second sun gear and being configured to transmit the first intermediate output torque to the second planetary gear set. The plurality of first planet gears meshingly engaged with the second sun gear and the first ring gear. The first ring gear axially positionable in a first condition wherein the first ring gear is fixed relative to the housing.

The second planetary gear set includes a second ring gear and a second planet gear assembly. The second planet gear assembly has a second planet carrier and a plurality of second planet gears. The second planet carrier has an output sun gear and a plurality of pinions for rotatably supporting the plurality of second planet gears. The second sun gear is meshingly engaged with the plurality of second plane gears and transmits the first intermediate output torque thereto. The output sun gear configured to output a second intermediate output torque. The plurality of second planet gears are also meshingly engaged with the second ring gear. The second ring gear is axially positionable in a first condition wherein the second ring gear is fixed relative to the housing to prevent relative rotation therebetween. The second ring gear is also axially positionable in a second condition wherein the second ring gear is rotatable within the transmission bore.

The third planetary gear set includes a third ring gear and a third planet gear assembly. The third planet gear assembly has a third planet carrier and a plurality of third planet gears. The third planet carrier has an output member and a plurality of pinions that rotatably support the plurality of third planet gears. The plurality of third planet gears are meshingly engaged with the third ring gear and the output sun gear and are configured to receive the second intermediate output torque. The output member is configured to output an output torque. The third ring gear is axially positionable in a first condition wherein the third ring gear is fixed relative to the housing to prevent relative rotation therebetween. The third ring gear is also axially positionable in a second condition wherein the third ring gear is rotatable within the transmission bore.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Overview

Figure 1:
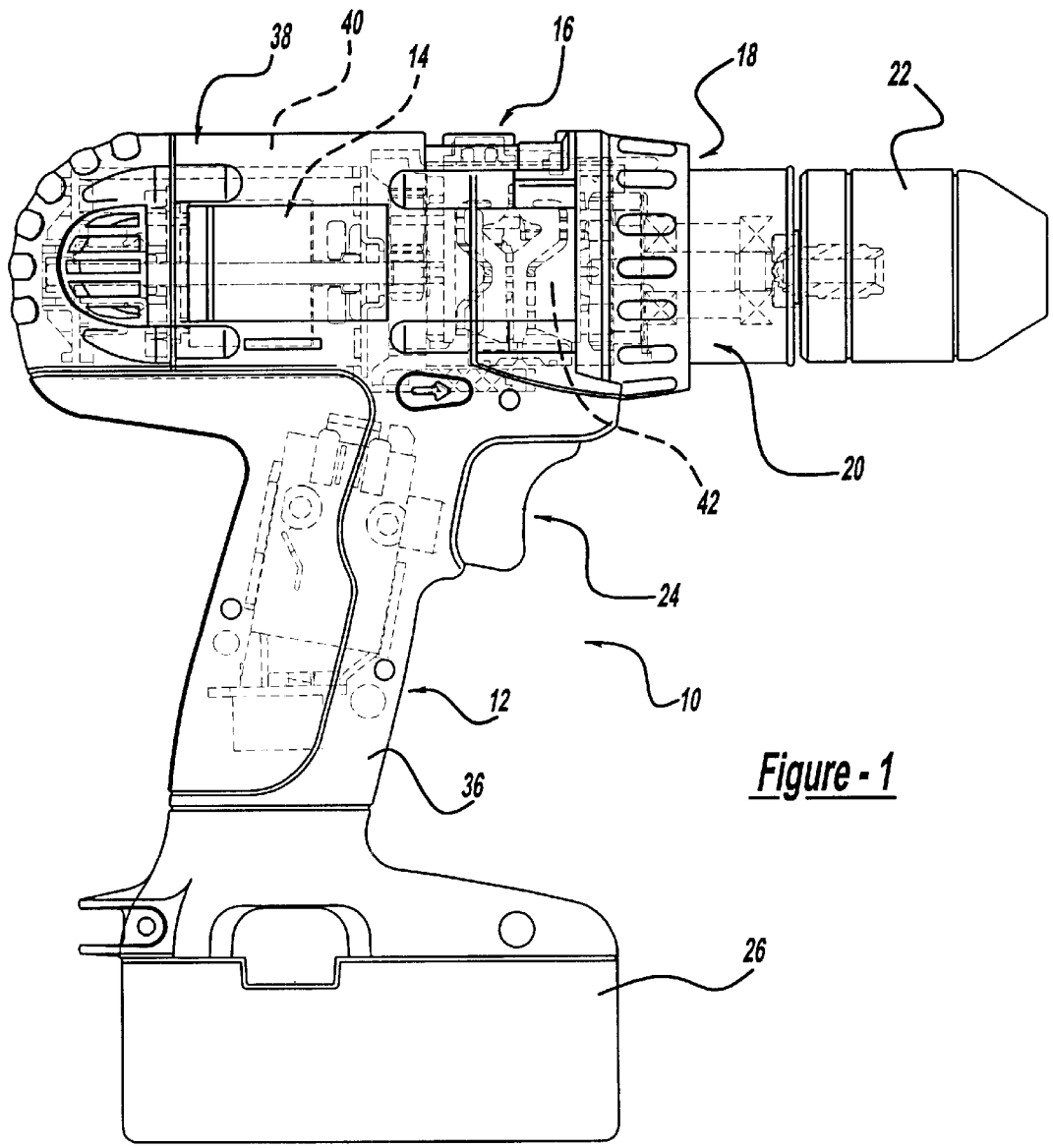
FIG. 1 is a side view of a power tool constructed in accordance with the teaching of the present invention.
Figure 2:
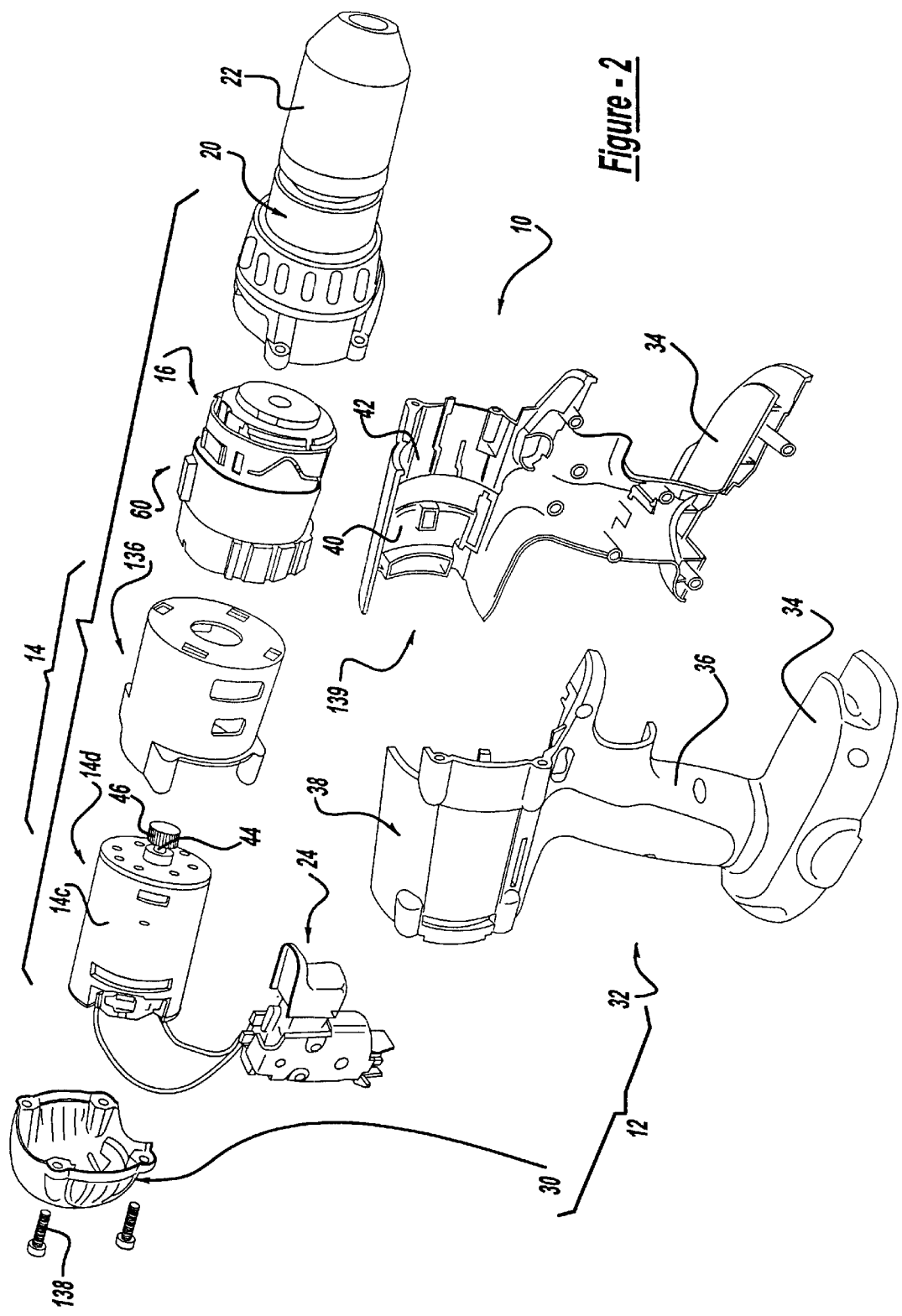
FIG. 2 is an exploded perspective view of a portion of the power tool of FIG. 1.
Figure 3:
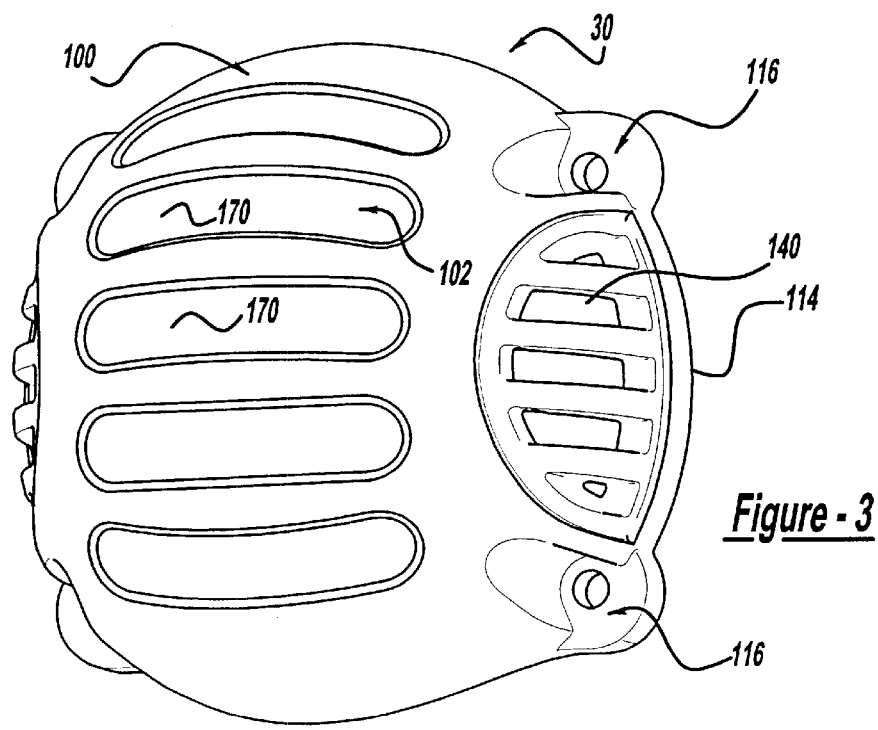
FIG. 3 is a perspective view of a portion of the housing of the power tool of FIG. 1 illustrating the rear of the end cap assembly.
Figure 4:
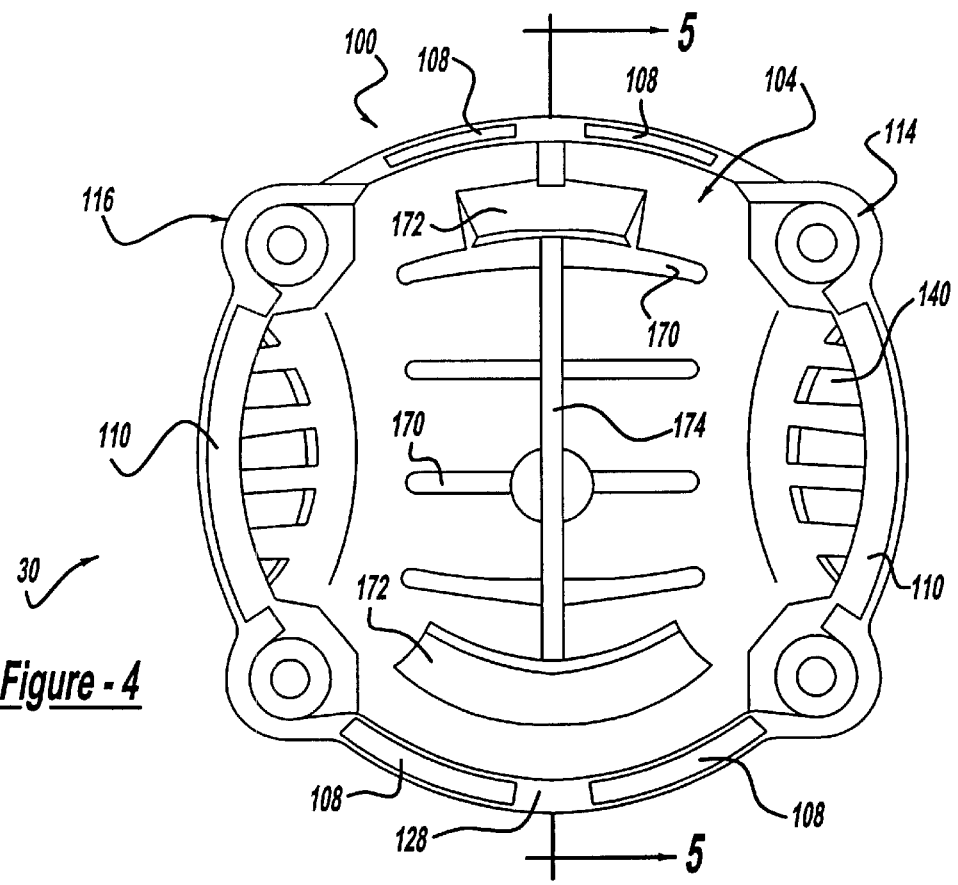
FIG. 4 is a front view of the end cap assembly.
Figure 5:
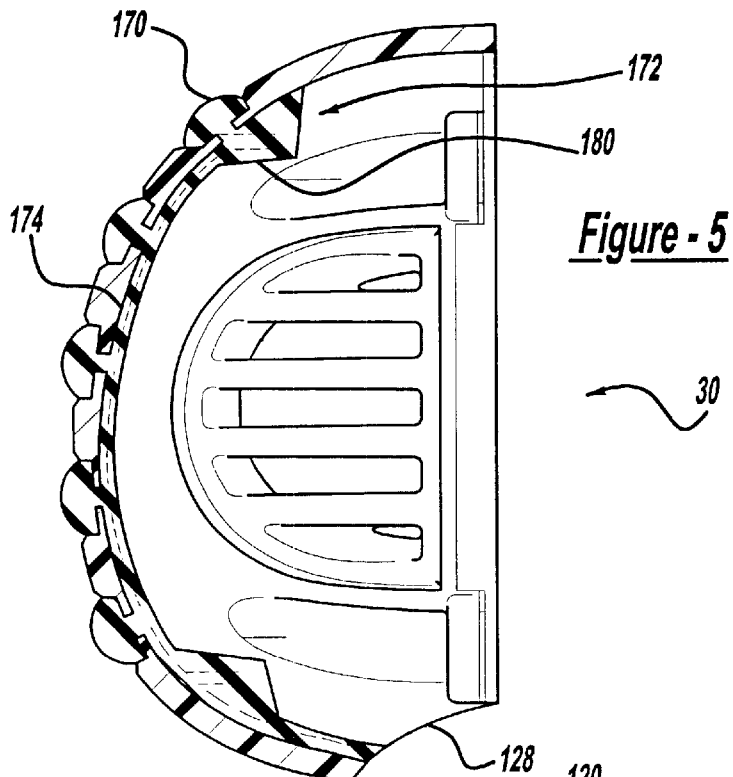
FIG. 5 is a section view taken along the line 5—5 of FIG. 4.
Figure 6:
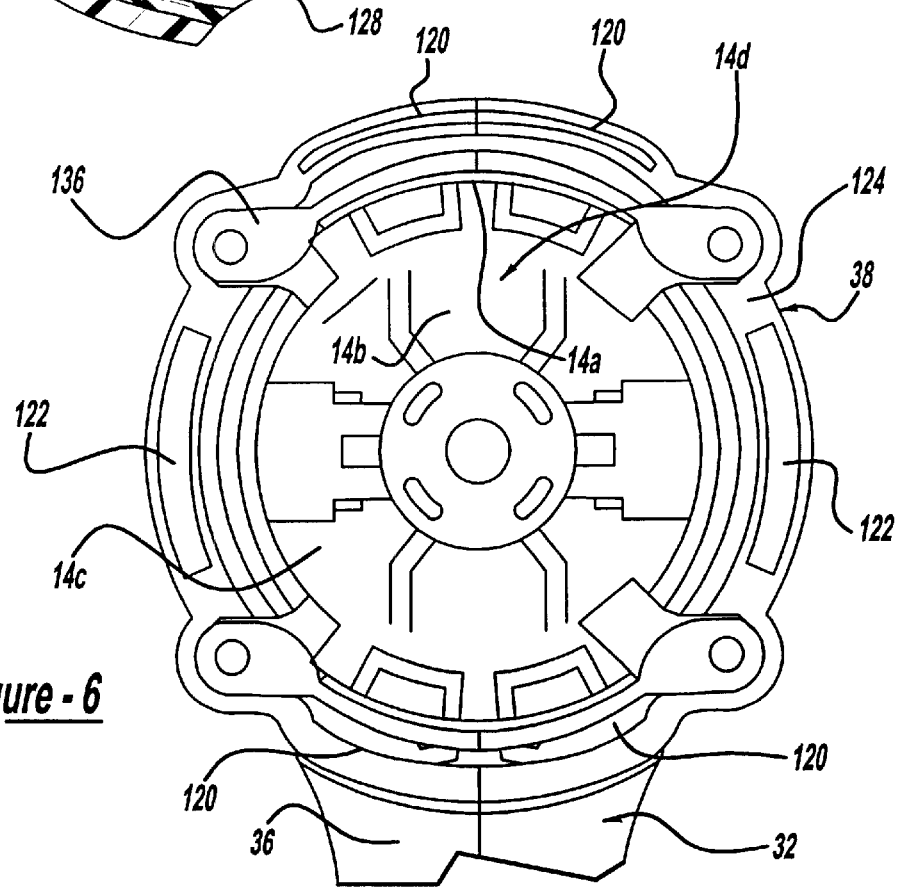
FIG. 6 is a rear view of a portion of the power tool of FIG. 1 with the end cap assembly removed.
Figure 7:
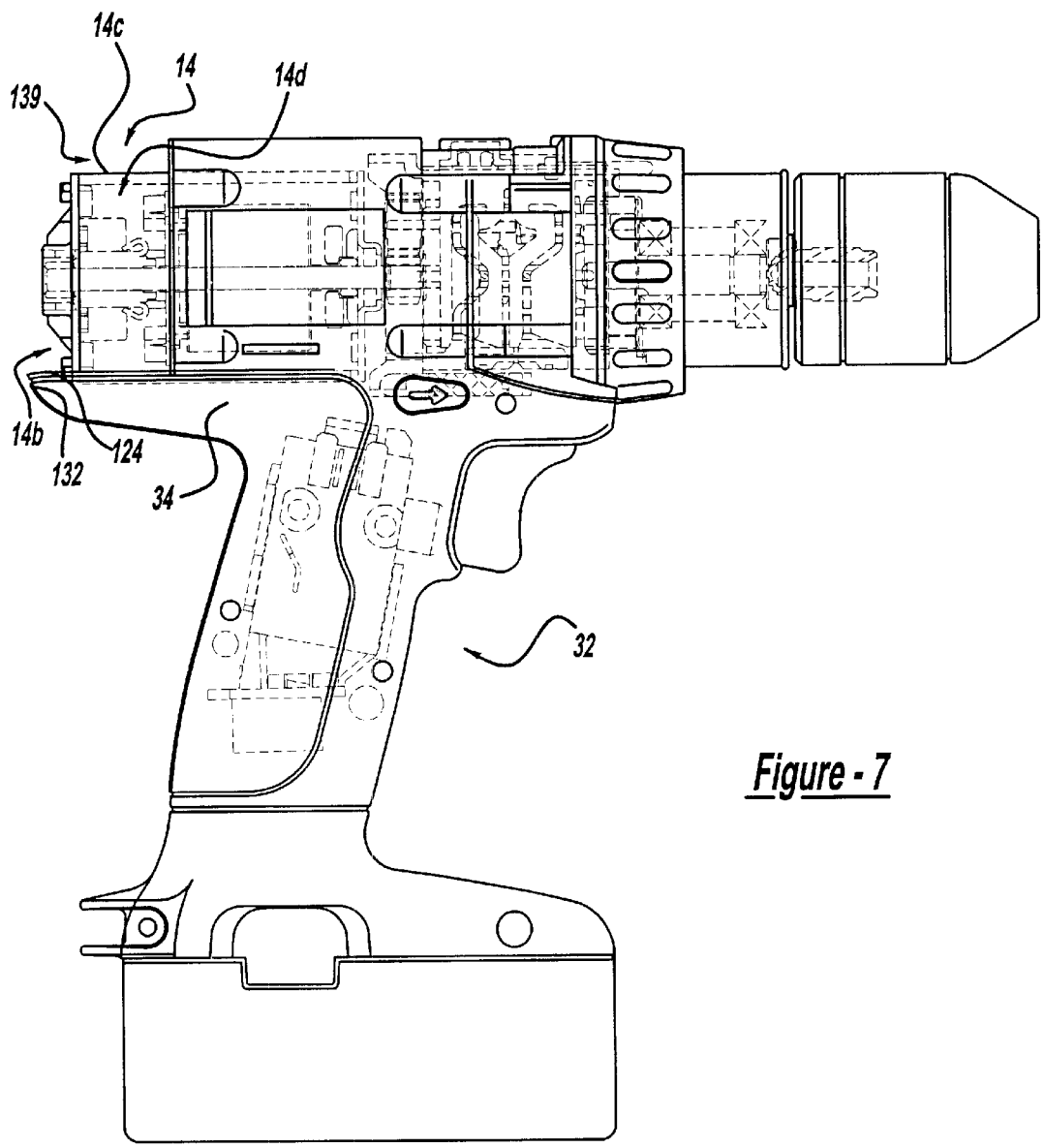
FIG. 7 is a side view of a portion of the power tool of FIG. 1 with the end cap assembly removed.
Figure 8:
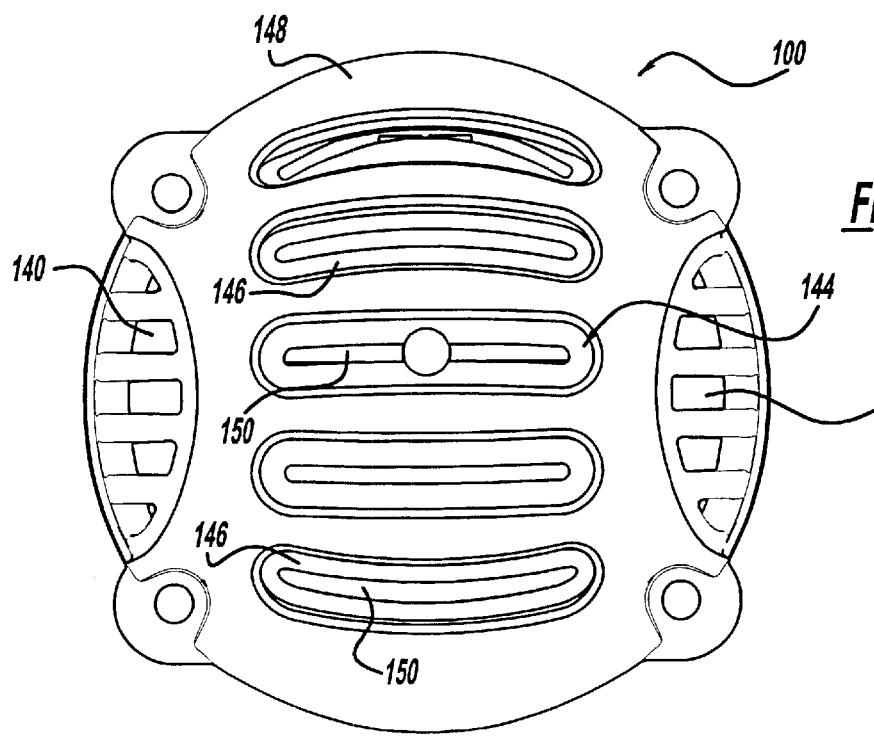
FIG. 8 is a view similar to that of FIG. 4, but illustrating the end cap shell prior to the overmolding operation.
Figure 9:
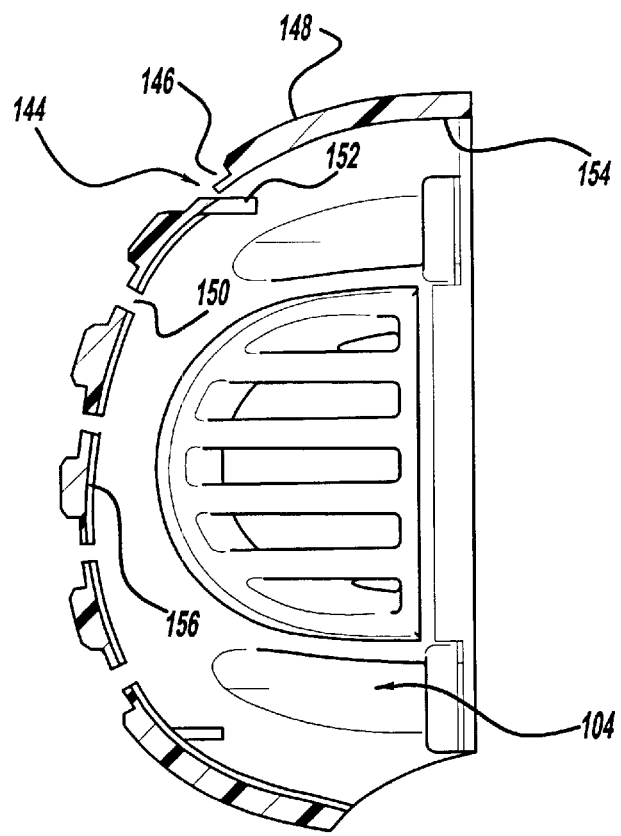
FIG. 9 is a view similar to that of FIG. 5, but illustrating the end cap shell prior to the overmolding operation.

With reference to FIGS. 1 and 2 of the drawings, a power tool constructed in accordance with the teachings of the present invention is generally indicated by reference numeral 10. As those skilled in the art will appreciate, the preferred embodiment of the present invention may be either a cord or cordless (battery operated) device, such as a portable screwdriver or drill. In the particular embodiment illustrated, power tool 10 is a cordless drill having a housing 12, a motor assembly 14, a multi-speed transmission assembly 16, a clutch mechanism 18, an output spindle assembly 20, a chuck 22, a trigger assembly 24 and a battery pack 26. Those skilled in the art will understand that several of the components of power tool 10, such as the chuck 22, the trigger assembly 24 and the battery pack 26, are conventional in nature and need not be described in significant detail in this application. Reference may be made to a variety of publications for a more complete understanding of the operation of the conventional features of power tool 10. One example of such publications is commonly assigned U.S. Pat. No. 5,897,454 issued Apr. 27, 1999, the disclosure of which is hereby incorporated by reference as if fully set forth herein.

Housing 12 includes an end cap assembly 30 and a handle shell assembly 32 that includes a pair of mating handle shells 34. Handle shell assembly 32 includes a handle portion 36 and a drive train or body portion 38. Trigger assembly 24 and battery pack 26 are mechanically coupled to handle portion 36 and electrically coupled to motor assembly 14. Body portion 38 includes a motor cavity 40 and a transmission cavity 42. Motor assembly 14 is housed in motor cavity 40 and includes a rotatable output shaft 44, which extends into transmission cavity 42. A motor pinion 46 having a plurality of gear teeth 48 is coupled for rotation with output shaft 44. Trigger assembly 24 and battery pack 26 cooperate to selectively provide electric power to motor assembly 14 in a manner that is generally well known in the art so as to control the speed and direction with which output shaft 44 rotates.

Transmission assembly 16 is housed in transmission cavity 42 and includes a speed selector mechanism 60. Motor pinion 46 couples transmission assembly 16 to output shaft 44, transmitting a relatively high speed, low torque drive input to transmission assembly 16. Transmission assembly 16 includes a plurality of reduction elements that are selectively engaged by speed selector mechanism 60 to provide a plurality of speed ratios. Each of the speed ratios multiplies the speed and torque of the drive input in a predetermined manner, permitting the output speed and torque of the transmission assembly 16 to be varied in a desired manner between a relatively low speed, high torque output and a relatively high speed, low torque output. The transmission output is delivered the output spindle assembly 20, to which the chuck 22 is coupled for rotation, to permit torque to be transmitted to a tool bit (not shown). The clutch mechanism 18 is coupled to transmission assembly 16 and is operable for limiting the magnitude of the torque associated with the drive input to a predetermined, selectable torque limit.

Functional Overmold

With specific reference to FIGS. 2 through 9, end cap assembly 30 is shown to include an end cap shell 100 and an overmold member 102. In the example provided, the end cap shell 100 is injection molded from a plastic material, such as ABS. The end cap shell 100 defines an end cap cavity 104 that is sized to receive the portion of the motor assembly 14 that extends rearwardly of the handle shell assembly 32. A plurality of first and second radial tab apertures 108 and 110 and the abutting face 128 are formed into the forward face 114 of the end cap shell 100 and a plurality of screw bosses 116 are formed into the perimeter of the end cap shell 100. Each of the first and second radial tab apertures 108 and 110 is sized to receive one of the first radial tabs 120 and second radial tabs 122, respectively, that are formed into the rearward face 124 of the handle shells 34. The first and second radial tab apertures 108 and 110 cooperate with the first and second radial tabs 122 to properly align the end cap shell 100 to the handle shell assembly 32, as well as to inhibit relative rotation therebetween. An arcuate portion 128 of the forward face 114 of the end cap shell 100 is angled to match the abutting face 132 of the rearward face 124 of the handle shells 34. The screw bosses 116 permit the end cap shell 100 to be fixedly coupled to the motor cover 136 via a plurality of screws 138. The geometry of the motor cover 136 is such that it is constrained to the handle shells 34. As such, fastening of the end cap shell 100 to the motor cover 136 operates to fixedly retain the end cap shell 100 against as the rearward face 124 of the handle shell assembly 32, as well as to close off the rear handle aperture 139 in the handle shell assembly 32.

A plurality of side apertures 140 are formed into the sides of the end cap shell 100 to permit air to flow through the handle shell assembly 32 and cool the motor assembly 14 in a manner that is well known in the art. A plurality of rear apertures 144 are formed into the rear of the end cap shell 100, with each of the rear apertures 144 including a recessed portion 146 that extends only partially into the outer surface 148 of the end cap shell 100 and a through-portion 150 that extends completely through the end cap shell 100. A pair of retaining tabs 152 are formed to extend from the interior surface 154 of the end cap shell 100 inwardly into the end cap cavity 104. A channel 156 is formed into the interior surface 154 of the end cap shell 100 and intersects each of the rear apertures 144 and the retaining tabs 152.

The overmold member 102 is formed from a resilient material, such as thermoplastic elastomer (e.g., HYTREL® manufactured by E. I. du Pont de Nemours and Company) and is simultaneously formed and coupled to the end cap shell 100 in an injection molding operation. In the particular example provided, the overmold member 102 includes a plurality of bumper members 170, a pair of isolators 172 and a linking member 174. Each of the bumper members 170 extends from a point roughly coincident with the interior surface 154 of the end cap shell 100 to a point rearwardly of the outer surface 148 of the end cap shell 100 by about 0.5 mm to about 1.5 mm and preferably about 0.75 mm. Construction in this manner permits the bumper members 170 to provide a degree of shock absorption which reduces the likelihood of damaging the end cap shell 100 in the event that the tool 10 is dropped. Furthermore, it is sometimes necessary for an operator to apply a relatively high force to the tool 10, as when employing a hole saw to drill large diameter holes. In such situations, the operator is inclined to press onto the rear of the tool 10 to apply a force that is in-line with the axis of the chuck 22. In such situations, the bumper members 170 provide the operator with a relatively soft and comfortable surface which tends to resist slipping as well as attenuate the vibrations that are transmitted to the operator.

The isolators 172 are formed about the retaining tabs 152 on the interior surface 154 of the end cap shell 100. In the example provided, each of the isolators 172 includes an annular member 180 that extends forwardly of the interior surface 154 of the end cap shell 100. Construction in this manner permits the end cap shell 100 to engage the isolators 172 to the outer diameter 14a and the rear surface 14b of the motor housing 14c to fixedly retain the motor 14d within the motor cover 136. This prevents the components of the motor assembly 14 from moving along the longitudinal axis of the tool 10, as well as dampens vibrations that are created during the operation of the motor assembly 14. The linking member 174 is fixedly coupled to each of the bumper members 170 and the isolators 172. The linking member 174 provides a flow path through which the resilient material flows during the formation of the bumper members 170 and the isolators 172. The linking member 174 also interconnects the bumper members 170 and the isolators 172, thereby rendering their removal from the end cap shell 100 more difficult.

Figure 10:
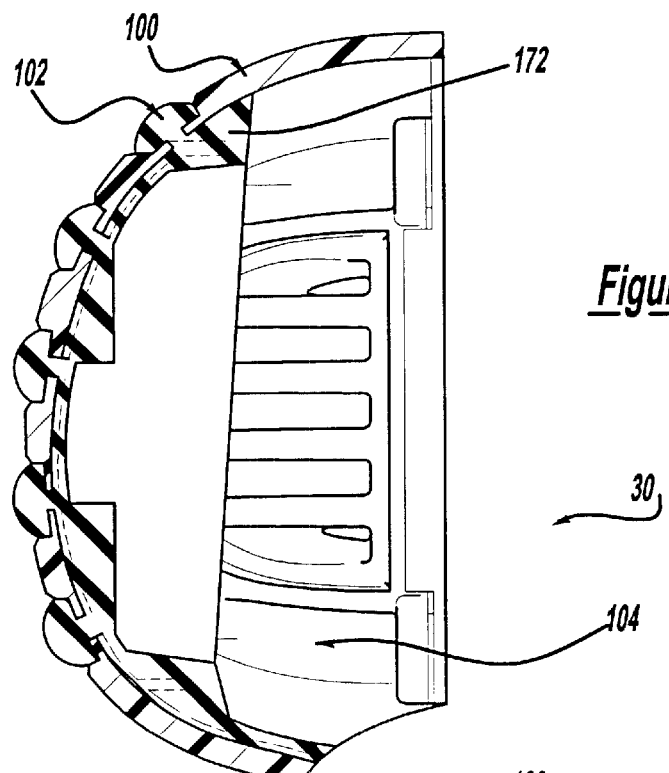
FIG. 10 is a view similar to that of FIG. 4, but illustrating an alternate construction of the overmold member.
Figure 11:
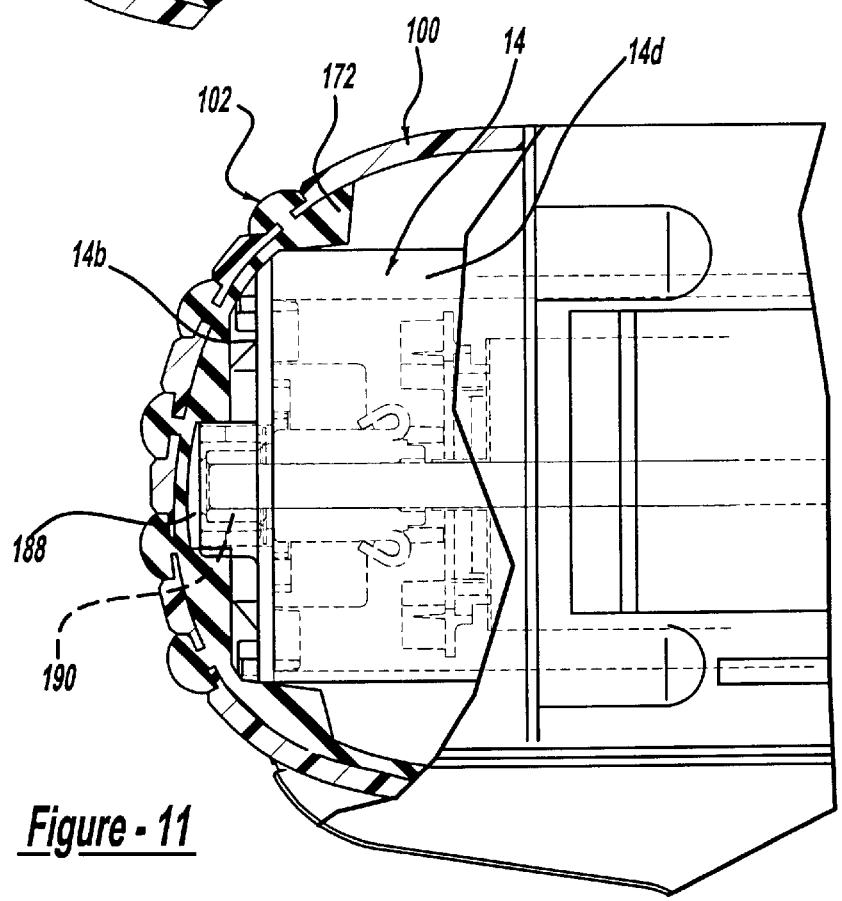
FIG. 11 is a partial sectional view of a portion of a power tool that employs an end cap assembly having an overmold member constructed in the manner illustrated in FIG. 10.

Those skilled in the art will appreciate that this aspect of the present invention may be incorporated into various other positions within the handle assembly 32 for sealing between two or more components, dampening vibrations or positioning one component relative to another. One such example is illustrated in FIGS. 10 and 11 where the isolators 172 are modified to extend around the perimeter of a portion of the end cap cavity 104 and sealingly contact the rear surface 14b of the motor 14d. The isolators 172 seal the interface between the end cap shell 100 and the motor assembly 14, while the bumper members 170 seal the rear apertures 144 in the end cap shell 100. The space 188 defined by the isolators 172 is then filled with grease or another suitable lubricant, which lubricates a motor armature bearing 190.

Transmission Assembly

Figure 12:
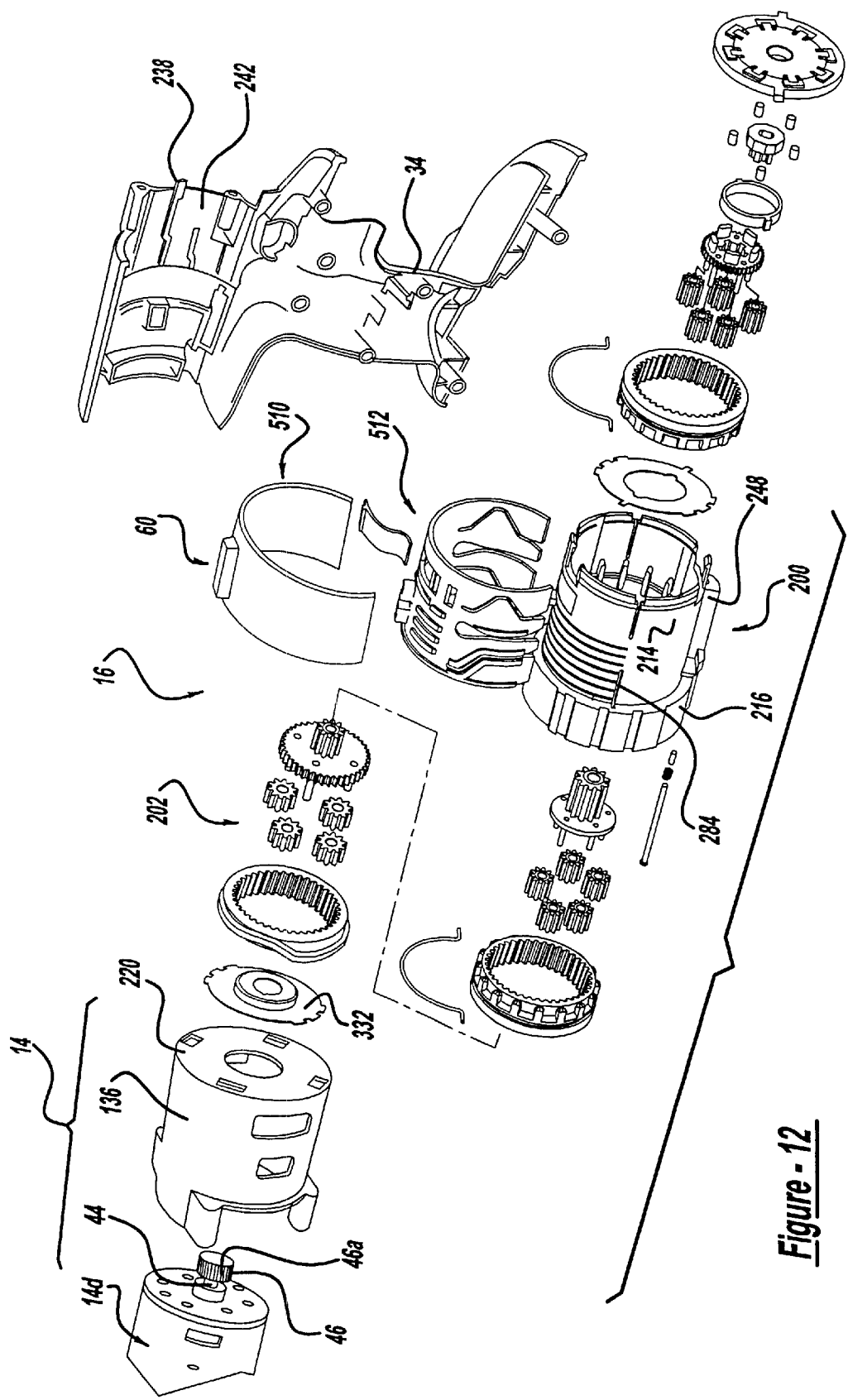
FIG. 12 is an exploded perspective view of a portion of the power tool of FIG. 1, illustrating the transmission assembly in greater detail.

With reference to FIG. 12, the transmission assembly 16 is shown to be a three-stage, three-speed transmission that includes a transmission sleeve 200, a reduction gearset assembly 202 and the speed selector mechanism 60. With additional reference to FIGS. 13 through 17, the transmission sleeve 200 includes a wall member 210 that defines a generally transmission bore or hollow cavity 212 into which the reduction gearset assembly 202 is disposed. The transmission sleeve 200 includes a body 214 and a base 216. The body 214 of the transmission sleeve 200 is fairly uniform in diameter and generally smaller in diameter than the base 216. The inside diameter of the base 216 is sized to receive the cylindrical nose portion 220 of the motor cover 136.

A plurality of raised lands 226 are formed into the base 216. The raised lands 226 define a plurality of first grooves 228 in the outer surface 230 of the base 216 and a plurality of second grooves 232 in the inner surface 234 of the base 216. The first grooves 228 are configured to receive the alignment ribs 238 that are formed into the inner surface 242 of the handle shells 34 to align the transmission sleeve 200 to the handle shells 34 and inhibit relative rotation between the transmission sleeve 200 and the housing 12. Preferably, the first grooves 228 and alignment ribs 238 are configured in a manner that the transmission sleeve 200 can only be assembled to the handle shells 34 in one orientation (i.e., the configuration of the first grooves 228 and alignment ribs 238 prevents the transmission sleeve 200 from being rotated 180° out of position relative to the handle shells 34). The second grooves 232 will be discussed in greater detail, below.

The body 214 of the transmission sleeve 200 is shown to include a cylindrical body portion 246 and a pin housing portion 248. In the particular embodiment illustrated, the cylindrical body portion 246 includes a selector cam guide 250, a plurality of lubricant grooves 252 and first and second sets of ring engagement teeth 254 and 256, respectively. The selector cam guide 250 is generally rectangular in cross section, extending outwardly from the top of the outer surface 258 of the body portion 246. The lubricant grooves 252 are formed concentrically around the upper half of the perimeter of the body portion 246. The lubricant grooves 252 have a depth of about 0.01 inch to about 0.030 inch to hold a lubricant, such as grease, on the upper half of the perimeter of the body portion 246. The operation of the selector cam guide 250 and the lubricant grooves 252 will be discussed in detail, below.

A raised bead 264 segregates the interior of the body portion 246 into first and second housing portions 260 and 262, respectively. The first set of ring engagement teeth 254 are formed onto the inner surface 266 of the body portion 246 and extend rearwardly from the raised bead 264 toward the base 216. The second set of ring engagement teeth 256 are also formed into the inner surface of the body portion 246 but extend forwardly from the raised bead 264. The teeth 268 of the first and second sets of ring engagement teeth 254 and 256 are uniformly spaced around the inner surface 266 of the body portion 246. The configuration of each tooth 268 in the first and second sets of ring engagement teeth 254 and 256 is similar in that each tooth extends from the raised bead 264, has a pair of parallel engagement surfaces 270 and terminates at a tip portion 272. The tip portion 272 of each tooth 268 is both rounded and tapered to enhance the ability with which it will mesh with a portion of the reduction gearset assembly 202 as will be described in detail, below.

The pin housing portion 248 extends downwardly from the body portion 246 over a significant portion of the length of the body portion 246. An actuator aperture 274 is formed into the pin housing portion 248 and extends rearwardly through the base 216 of the transmission sleeve 200. In the particular embodiment illustrated, the actuator aperture 274 is stepped, having a first portion 276 with a first diameter at the rear of the transmission sleeve 200 and a second portion 278 with a smaller second diameter at the front of the transmission sleeve 200. In the example shown, the first portion 276 of the actuator aperture 274 breaks through the wall of the first housing portion 260 and forms a groove 280 into the inner surface 234 of the base 216. The pin housing portion 248 will be discussed in further detail, below.

A pair of first clip slots 284 and a pair of second clip slots 286 are formed into the transmission sleeve 200, extending along the sides of the transmission sleeve 200 in a manner that is parallel the longitudinal axis of the transmission sleeve 200. The first pair of clip slots 284 is formed through the sides of the body portion 246 rearwardly of the raised bead 264 and extends rearwardly toward the base 216. The depth of the first pair of clip slots 284 is such that they do not extend through the portion of the wall member 210 that defines the base 216. The second pair of clip slots 286 are also formed through the sides of the body portion 246 beginning forwardly of the raised bead 264 and extending through the front face 288 of the transmission sleeve 200.

With reference to FIGS. 12, 13, 18 and 23, the reduction gearset assembly 202 includes a first reduction gear set 302, a second reduction gear set 304 and a third reduction gear set 306. The first, second and third reduction gear sets 302, 304 and 306 are operable in an active mode and an inactive mode. Operation in the active mode causes the reduction gear set to perform a speed reduction and torque multiplication operation, while operation of the reduction gear set in an inactive mode for causes the reduction gear set to provide an output having a speed and torque that is about equal to the speed and torque of the rotary input provided to that reduction gear set. In the particular embodiment illustrated, each of the first, second and third reduction gear sets 302, 304 and 306 are planetary gear sets. Those skilled in the art will understand, however, that various other types of reduction gear sets that are well known in the art may be substituted for one or more of the reduction gear sets forming the reduction gearset assembly 202.

As shown, the first reduction gear set 302 includes a first reduction element or ring gear 310, a first set of planet gears 312 and a first reduction carrier 314. The first ring gear 310 is an annular structure, having a plurality of gear teeth 310a formed along its interior diameter. A clutch face 316 is formed into the outer perimeter of the front face 318 of the first ring gear 310 and will be discussed in greater detail, below. The first ring gear 310 is disposed within the portion of the hollow cavity 212 defined by the base 216; the front face 318 of the first ring gear 310 contacts a step 320 formed into the transmission sleeve 200, thereby limiting the ability of the first ring gear 310 to move forwardly into the hollow cavity 212.

The first reduction carrier 314 is formed in the shape of a flat cylinder, having plurality of pins 322 that extend from its rearward face 324. A plurality of gear teeth 314a are formed into almost the entire outer perimeter of the first reduction carrier 314, with a valley 314b being formed between each pair of adjacent gear teeth 314a. Due to the spacing of the gear teeth 314a, one of the valleys (i.e., valley 314b') is relatively larger than the remaining valleys 314b due to the omission of a tooth 314a in the outer perimeter of the first reduction carrier 314. In the particular embodiment illustrated, the gear teeth 314a of the first reduction carrier 314 are configured so as not to be meshingly engagable with the gear teeth 310a of the first ring gear 310.

Figure 19:
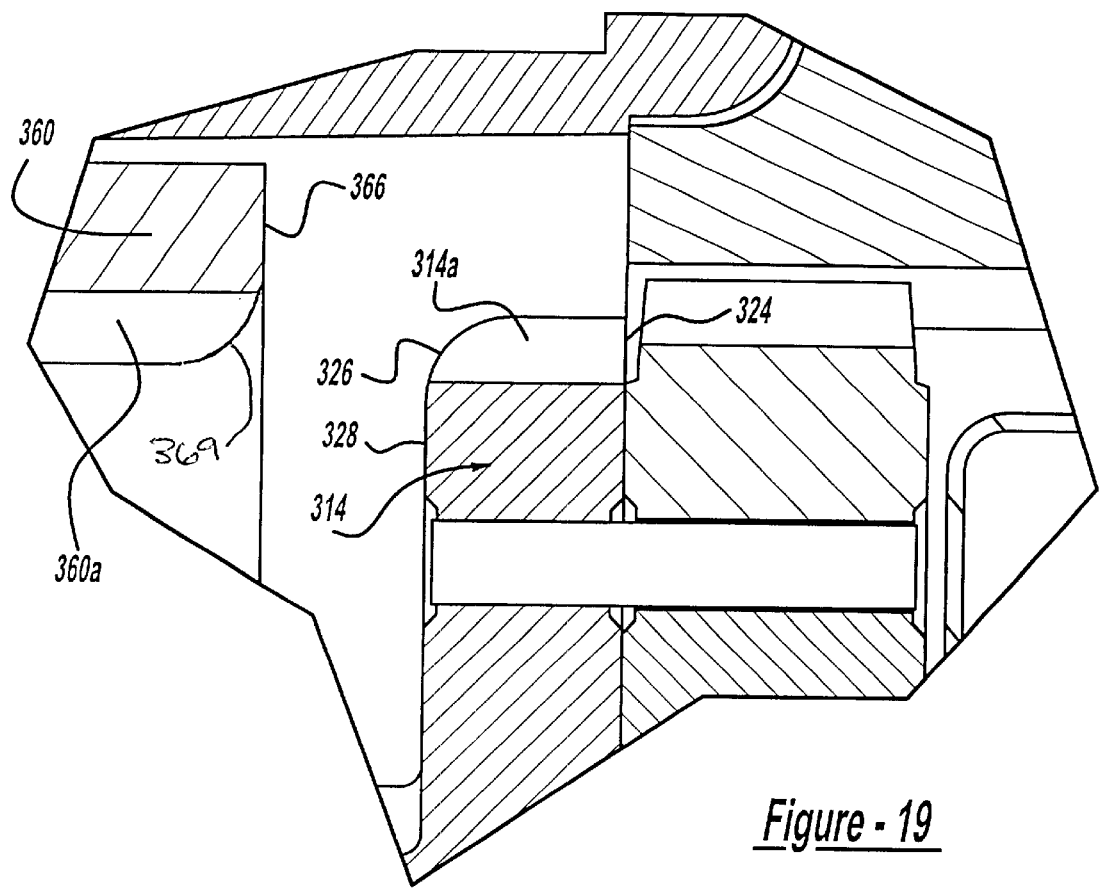
FIG. 19 is a sectional view taken along a longitudinal axis of the power tool of FIG. 1 illustrating a portion of the reduction gearset assembly in greater detail.
Figure 20:
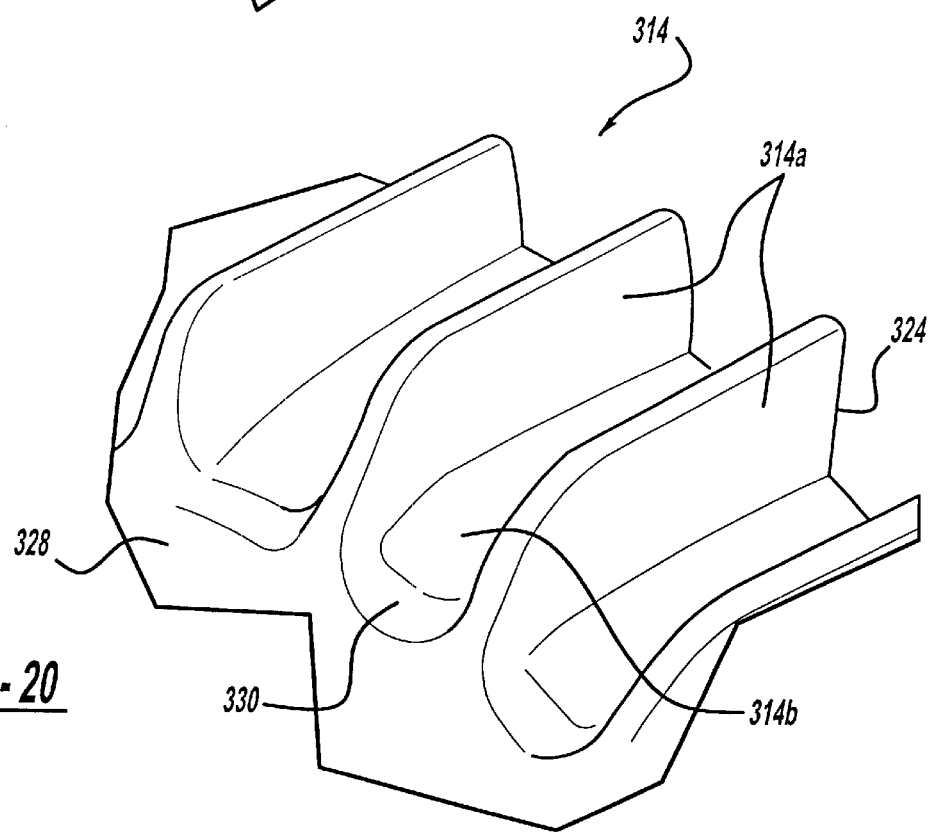
FIG. 20 is a front view of a portion of the first reduction carrier.

With specific reference to FIGS. 19 and 20, the profile of the gear teeth 314a is illustrated in greater detail. As shown, each gear tooth 314a terminates at a gradual radius 326 at the forward face 328 of the first reduction carrier 314 but terminates abruptly at the rearward face 324 of the first reduction carrier 314. A radius 330 is also formed on the valleys 314b between the gear teeth 314a.

Returning to FIGS. 12, 13, 15, 18 and 23, a first thrust washer 332 having a first annular portion 334, a second annular portion 336 and a plurality of retaining tabs 338 is positioned rearwardly of the first reduction gear set 302. The retaining tabs 338 engage the second grooves 232 in the base 216 of the transmission sleeve 200 and as such, relative rotation between the first thrust washer 332 and the transmission sleeve 200 is inhibited. The inside diameter of the base 216 is sized to receive the motor cover 136 and as such, the front face 340 of the motor cover 136 inhibits the axial movement of the first thrust washer 332. The first annular portion 334 contacts the rear face 342 of the first ring gear 310, providing a wear surface and controlling the amount by which the first ring gear 310 is able to move in an axial direction. The second annular portion 336 is spaced axially apart from the first annular portion 334, extending forwardly of the first annular portion 334 to provide a wear surface for the first set of planet gears 312 that also controls the amount by which they can move in an axial direction.

The first set of planet gears 312 includes a plurality of planet gears 344, each of which being generally cylindrical in shape, having a plurality of gear teeth 344a formed into its outer perimeter and a pin aperture 346 formed its their center. Each planet gear 344 is rotatably supported on an associated one of the pins 322 and the first reduction carrier 314 and is positioned such that its teeth 344a meshingly engage the teeth 314a of the first ring gear 310. A raised portion 348 is formed into the front and rear face 350 and 352 of each planet gear 344 that inhibits the teeth 344a from rubbing on the first reduction carrier 314 and the first thrust washer 332 and creating dust or chips that would impair the performance of the transmission assembly 16 and reduce its operating life. As the teeth 46a of the motor pinion 46 on the output shaft 44 are also meshingly engaged with the teeth 344a of the planet gears 344, the motor pinion 46 serves as a sun gear for the first reduction gear set 302.

The second reduction gear set 304 is disposed within the portion of the hollow cavity 212 defined by the first housing portion 260 and includes a second sun gear 358, a second reduction element or ring gear 360, a second set of planet gears 362 and a second reduction carrier 364. The second sun gear 358 is fixed for rotation with the first reduction carrier 314. The second sun gear 358 includes a plurality of gear teeth 358a that extend forwardly of the forward face 328 of the first reduction carrier 314.

The second ring gear 360 is an annular structure, having a plurality of gear teeth 360a formed along its interior diameter. The gear teeth 360a may be heavily chamfered at the rear face 366 of the second ring gear 360 but terminate abruptly at the front face 368. More preferably, a heavy radius 369 is formed onto the rear face 366 and the sides of each of the gear teeth 360a, with the heavy radius 369 being employed rather than the heavy chamfer as the heavy radius 369 on the gear teeth 360a provides for better engagement between the second ring gear 360 and the first reduction carrier 314.

A plurality of sleeve engagement teeth 370 are formed into the outer perimeter of the second ring gear 360; the sleeve engagement teeth 370 extend forwardly toward the front face 368 of the second ring gear 360 and terminate at a tip portion 372 that is rounded and tapers forwardly and inwardly. An annular clip groove 374 is also formed into the outer perimeter of the second ring gear 360. In the example illustrated, the clip groove 374 is a rectangular slot having a pair of sidewalls 376. The clip groove 374 will be discussed in greater detail, below.

The second reduction carrier 364 is formed in the shape of a flat cylinder, having plurality of pins 378 that extend from its rearward face 380. The second set of planet gears 362 is shown to include a plurality of planet gears 382. Each planet gear 382 is generally cylindrical in shape, having a plurality of gear teeth 382a formed into its outer perimeter and a pin aperture 384 formed its center. Each planet gear 382 is rotatably supported on an associated one of the pins 378 and the second reduction carrier 364 is positioned such that the gear teeth 382a of the planet gears 382 meshingly engage the gear teeth 360a of the second ring gear 360. The gear teeth 358a of the second sun gear 358 are also meshingly engaged with the gear teeth 382a of the planet gears 382.

The third reduction gear set 306 is disposed within the portion of the hollow cavity 212 defined by the second housing portion 262 and includes a third sun gear 398, a third reduction element or ring gear 400, a third set of planet gears 402 and a third reduction carrier 404. The third sun gear 398 is fixed for rotation with the second reduction carrier 364. The third sun gear 398 includes a plurality of gear teeth 398a that extend forwardly of the front face 406 of the second reduction carrier 364.

The third ring gear 400 is an annular structure, having a plurality of gear teeth 400a formed along its interior diameter. The gear teeth 400a may be heavily chamfered at the front face 412 of the third ring gear 400, but terminate abruptly at the rear face 414. More preferably, a heavy radius 407 is formed onto the front face 412 and the sides of each of the gear teeth 400a, with the heavy radius 407 being employed rather than the heavy chamfer as the heavy radius 407 on the gear teeth 400a provides for better engagement between the third ring gear 400 and the third reduction carrier 404. A plurality of sleeve engagement teeth 418 are formed into the outer perimeter of the third ring gear 400; the sleeve engagement teeth 418 extend rearward toward the rear face 414 of the third ring gear 400 and terminate at a tip portion 420 that is rounded and tapers rearwardly and inwardly. An annular clip groove 422 is also formed into the outer perimeter of the third ring gear 400. In the example illustrated, the clip groove 422 is a rectangular slot having a pair of sidewalls 424. The clip groove 422 will be discussed in greater detail, below.

The third reduction carrier 404 is formed in the shape of a flat cylinder, having plurality of pins 428 that extend from its rearward face 430. A plurality of gear teeth 404a are formed into almost the entire outer perimeter of the third reduction carrier 404, with a valley 404b being formed between each pair of adjacent teeth 404a. Due to the spacing of the teeth 404a, one of the valleys 404b (i.e., valley 404b') is relatively larger than the remaining valleys 404b due to the omission of a tooth 404a in the outer perimeter of the third reduction carrier 404. In the particular embodiment illustrated, the gear teeth 404a of the third reduction carrier 404 are configured so as not to be meshingly engagable with the gear teeth 382a of the second planet gears 382.

Figure 21:
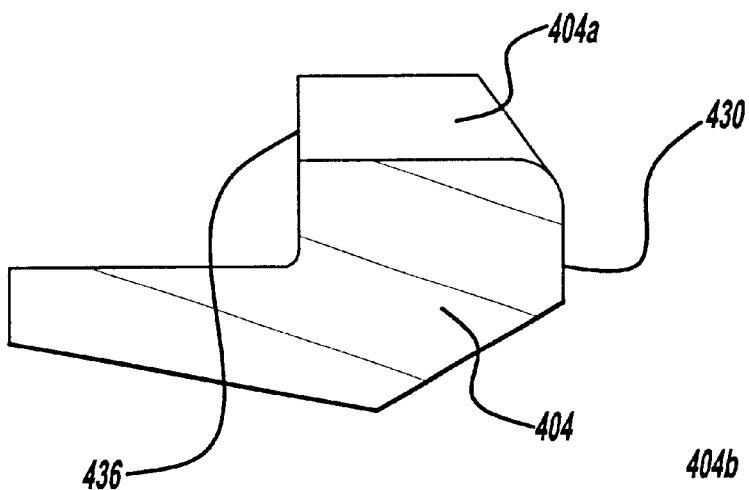
FIG. 21 is a sectional view taken along a longitudinal axis of the power tool of FIG. 1 illustrating a portion of the reduction gearset assembly in greater detail.
Figure 22:
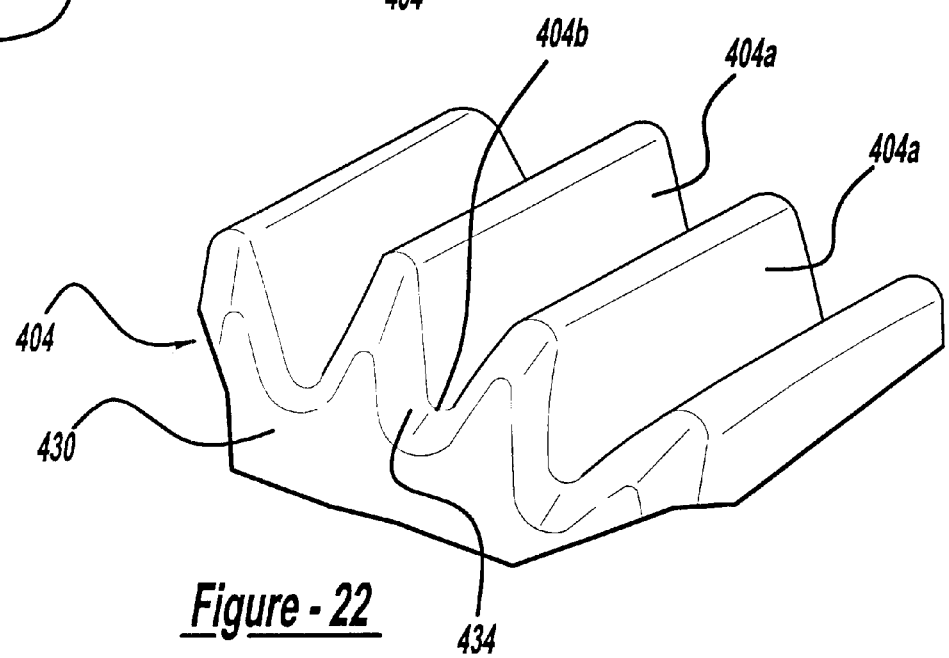
FIG. 22 is a rear view of a portion of the third reduction carrier.

With brief additional reference to FIGS. 21 and 22, the profile of the gear teeth 404a is illustrated in greater detail. As shown, the rear face 430 of the third reduction carrier 404 is chamfered and a heavy radius 434 is formed into each of sides of the teeth 404a and valleys 404b. Each gear tooth 404a terminates abruptly at the forward face 436 of the third reduction carrier 404.

Returning back to FIGS. 12, 13, 15, 18 and 23, the third set of planet gears 402 is shown to include a plurality of planet gears 438. Each planet gear 438 is generally cylindrical in shape, having a plurality of gear teeth 438a formed into its outer perimeter and a pin aperture 440 formed through its center. Each planet gear 438 is rotatably supported on an associated one of the pins 428 and the third reduction carrier 404 is positioned such that the gear teeth 438a of the planet gears 438 meshingly engage the gear teeth 400a of the third ring gear 400. A raised portion 442 is formed into each of the front and rear faces of the planet gears 438 which inhibits the gear teeth 438a from rubbing on the third reduction carrier 404 and creating dust or chips that would impair the performance of the transmission assembly 12 and reduce its operating life. A second thrust washer 450 is disposed around the third sun gear 398 and the teeth 398a of the third sun gear 398 are meshingly engaged with the gear teeth 438a of the planet gears 438. The second thrust washer 450 includes a plurality of retaining tabs 452 that are configured to engage corresponding tab grooves 454 (FIG. 13) that are formed in the inner surface 266 of body portion 246 of the transmission sleeve 200. The retaining tabs 452 and the tab grooves 454 cooperate to inhibit relative rotation between the second thrust washer 450 and the transmission sleeve 200.

The output spindle assembly 20 includes a transmitting means 458 for coupling a spindle 460 for rotation with the third reduction carrier 404 so as to transmit drive torque from the reduction gearset assembly 202 to the chuck 22. Such transmitting means 458 are well known in the art and easily adapted to the transmission assembly of the present invention. Accordingly, a detailed discussion of the transmitting means 458 need not be included herein.

With reference to FIGS. 13, 13a, 13b, 16, 17, 18 and 23 through 28, the speed selector mechanism 60 is movable between a first position 500, a second position 502 and a third position 504 and includes a switch portion 510 for receiving a speed change input and an actuator portion 512 for manipulating the reduction gearset assembly 202 in accordance with the speed change input. The actuator portion 512 is operatively coupled to the reduction gearset assembly 202 and moves the second and third reduction gear sets 304 and 306 between the active and inactive modes in response to movement of the switch portion 510 between the first, second and third positions 500, 502 and 504. In the particular embodiment illustrated, the actuator portion 512 includes a rotary selector cam 520, a plurality of wire clips 522 and a spring member 523. Each of the wire clips 522 is formed from a round wire which is bent in the shape of a semi-circle 524 with a pair of tabs 526 extending outwardly from the semi-circle 524 and positioned on about the centerline of the semi-circle 524. The semi-circle 524 is sized to fit within the clip grooves 374 and 422 in the second and third ring gears 360 and 400, respectively. In this regard, the semi-circle 524 neither extends radially outwardly of an associated one of the ring gears (360, 400), nor binds against the sidewalls (376, 424) of the clip grooves (374, 422). In the example provided, the sidewalls (376, 424) of the clip grooves (374, 422) are spaced apart about 0.05 inch and the diameter of the wire forming the wire clips 522 is about 0.04 inch.

The tabs 526 of the wire clips 522 extend outwardly of the hollow cavity 212 into an associated one of the clip slots (284, 286) that is formed into the transmission sleeve 200. The tabs 526 are long enough so that they extend outwardly of the outer surface 258 of the body 214 of the transmission sleeve 200, but not so far as to extend radially outwardly of the portion of the first clip slots 284 in the base 216 of the transmission sleeve 200. Configuration of the wire clips 522 in this manner facilitates the assembly of the transmission assembly 16, permitting the wire clips 522 to be installed to the second and third ring gears 360 and 400, after which these assemblies are inserted into the hollow cavity 212 along the longitudinal axis of the transmission sleeve 200.

With specific reference to FIGS. 13 and 27a through 27c, the rotary selector cam 520 is illustrated to include an arcuate selector body 530, a switch tab 532 and a plurality of spacing members 534. A pair of first cam slots 540a and 540b, a pair of second cam slots 544a and 544b, a spring aperture 546 and a guide aperture 548 are formed through the selector body 530. The selector body 530 is sized to engage the outside diameter of the body portion 246 of the transmission sleeve 200 in a slip-fit manner. The guide aperture 548 is generally rectangular in shape and sized to engage the front and rear surfaces of the selector cam guide 250. The guide aperture 548 is considerably wider than the width of the selector cam guide 250, being sized in this manner to permit the rotary selector cam 520 to be rotated on the transmission sleeve 200 between a first rotational position, a second rotational position and a third rotational position. The selector cam guide 250 and cooperates with the guide aperture 548 to limit the amount by which the rotary selector cam 520 can be rotated on the transmission sleeve 200, with a first lateral side of the selector cam guide 250 contacting a first lateral side of the guide aperture 548 when the rotary selector cam 520 is positioned in the first rotational position, and a second lateral side of the selector cam guide 250 contacting a second lateral side of the guide aperture 548 when the rotary selector cam 520 is positioned in the third rotational position.

Each of the first cam slots 540a and 540b is sized to receive one of the tabs 526 of the wire clip 522 that is engaged to the second ring gear 360. In the particular embodiment illustrated, first cam slot 540a includes a first segment 550, a second segment 552 and an intermediate segment 554. The first segment 550 is located a first predetermined distance away from a reference plane 558 that is perpendicular to the longitudinal axis of the rotary selector cam 520 and the second segment 552 is located a second distance away from the reference plane 558. The intermediate segment 554 couples the first and second segments 550 and 552 to one another. The configuration of first cam slot 540b is identical to that of first cam slot 540a, except that it is rotated relative to the rotary selector cam 520 such that each of the first, second and intermediate segments 550, 552 and 554 in the first cam slot 540b are located 180° apart from the first, second and intermediate segments 550, 552 and 554 in the first cam slot 540a.

Each of the second cam slots 544a and 544b is sized to receive one of the tabs 526 of a corresponding one of the wire clips 522. In the particular embodiment illustrated, second cam slot 544a includes a first segment 560, a second segment 562, a third segment 564 and a pair of intermediate segments 566 and 568. The first and third segments 560 and 564 are located a third predetermined distance away from the reference plane and the second segment 562 is located a fourth distance away from the reference plane 558. The intermediate segment 566a couples the first and second segments 560 and 562 to one another and the intermediate segment 568 couples the second and third segments 562 and 566 together. The configuration of second cam slot 544b is identical to that of second cam slot 544a, except that it is rotated relative to the rotary selector cam 520 such that each of the first, second, third and intermediate segments 560, 562, 564 and 566 and 568 in the second cam slot 544b are located 180° apart from the first, second, third and intermediate segments 560, 562, 564 and 566 and 568 in the second cam slot 544a.

With the tabs 526 of the wire clips 522 engaged to the first cam slots 540a and 540b and the second cam slots 544a and 544b, the rotary selector cam 520 may be rotated on the transmission sleeve 200 between the first, second and third positions 500, 502 and 504 to selectively engage and disengage the second and third ring gears 360 and 400 from the first and third reduction carriers 314 and 404, respectively. During the rotation of the rotary selector cam 520, the first cam slots 540a and 540b and the second cam slots 544a and 544b confine the wire tabs 526 of their associated wire clip 522 and cause the wire tabs 526 to travel along the longitudinal axis of the transmission sleeve 200 in an associated one of the first and second clip slots 284 and 286. Accordingly, the rotary selector cam 520 is operative for converting a rotational input to an axial output that causes the wire clips 522 to move axially in a predetermined manner. A lubricant (not specifically shown) is applied to the lubricant grooves 252 formed into body portion 246 of the transmission sleeve 200 is employed to lubricate the interface between the transmission sleeve 200 and the rotary selector cam 520.

Figure 23:
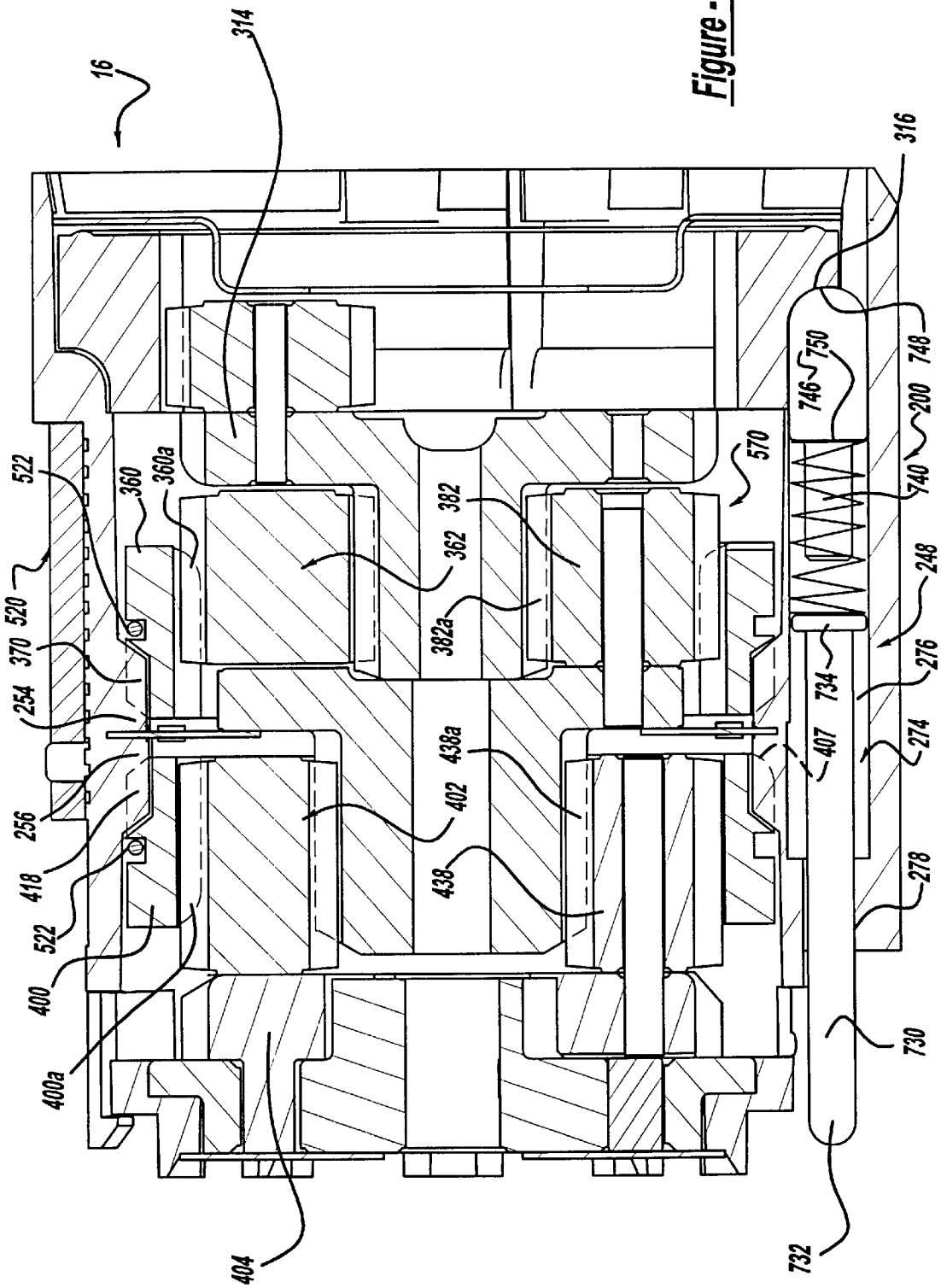
FIG. 23 is an sectional view taken along the longitudinal axis of the power tool of FIG. 1 and illustrating the transmission assembly as positioned in the first speed ratio.

Positioning the rotary selector cam 520 in the first rotational position 500 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the first segment 560 of the second cam slots 544a and 544b. Accordingly, positioning of the rotary selector cam 520 in the first rotational position causes the second and third ring gears 360 and 400 to be positioned in meshing engagement with the second and third planet gears 362 and 402, respectively. Simultaneously with the meshing engagement of the second and third ring gears 360 and 400 with the second and third planet gears 362 and 402, the sleeve engagement teeth 370 and 418 of the second and third ring gears 360 and 400, respectively, are positioned in meshing engagement with the first and second sets of ring engagement teeth 254 and 256, respectively, to inhibit relative rotation between the second and third ring gears 360 and 400 and the transmission sleeve 200 to thereby providing the transmission assembly 16 with a first overall gear reduction or speed ratio 570 as shown in FIG. 23. Those skilled in the art will understand that the tip portion 272 of the teeth 268 of the first and second sets of ring engagement teeth 254 and 256 and the tip portions 372 and 420 of the sleeve engagement teeth 370 and 418, respectively, are rounded and tapered so as to improve their capability for meshing engagement in response to axial repositioning along a longitudinal axis of the transmission assembly 16.

Figure 24:
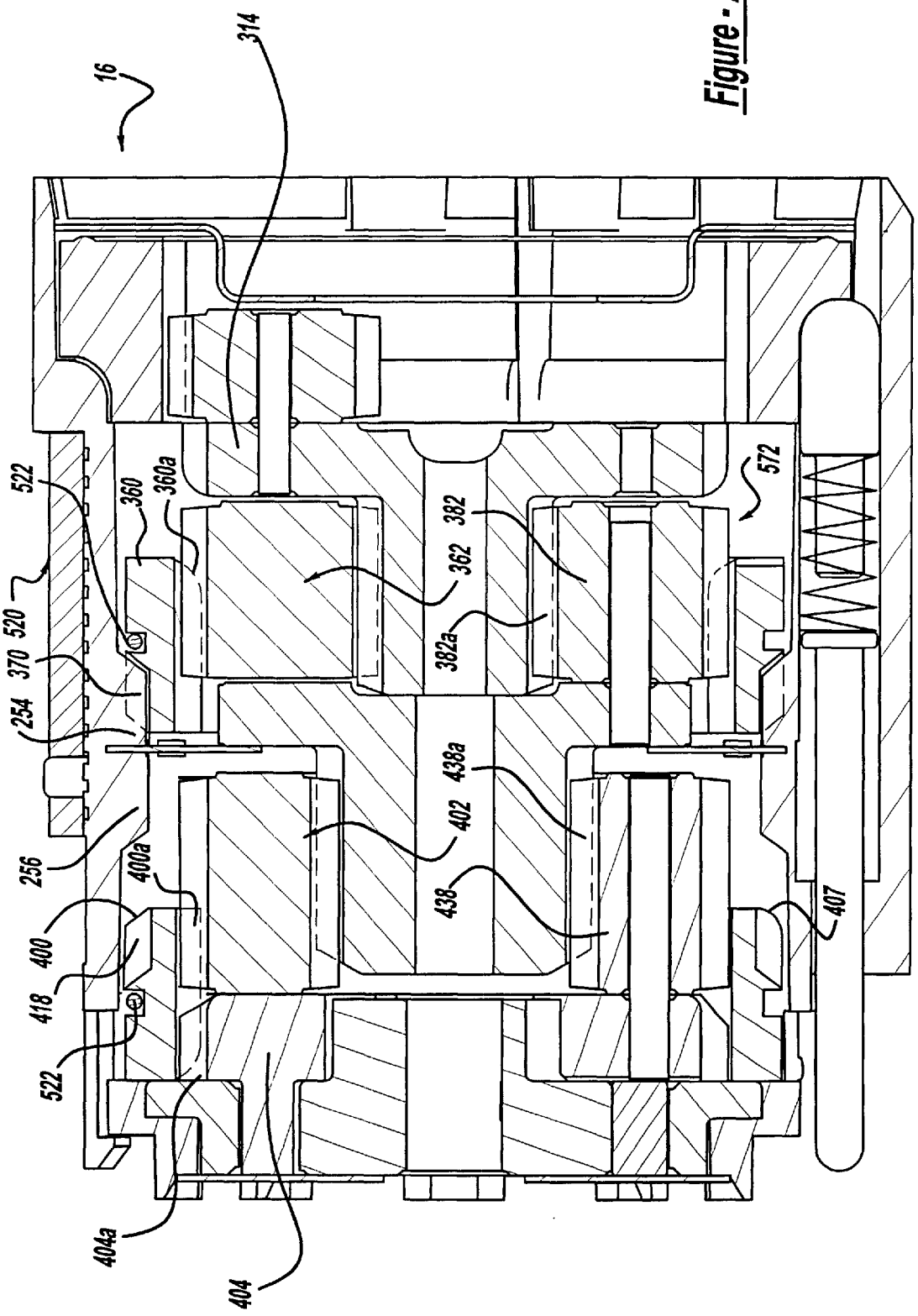
FIG. 24 is a sectional view similar to that of FIG. 23 but illustrating the transmission assembly as positioned in the second speed ratio.
Figure 25:
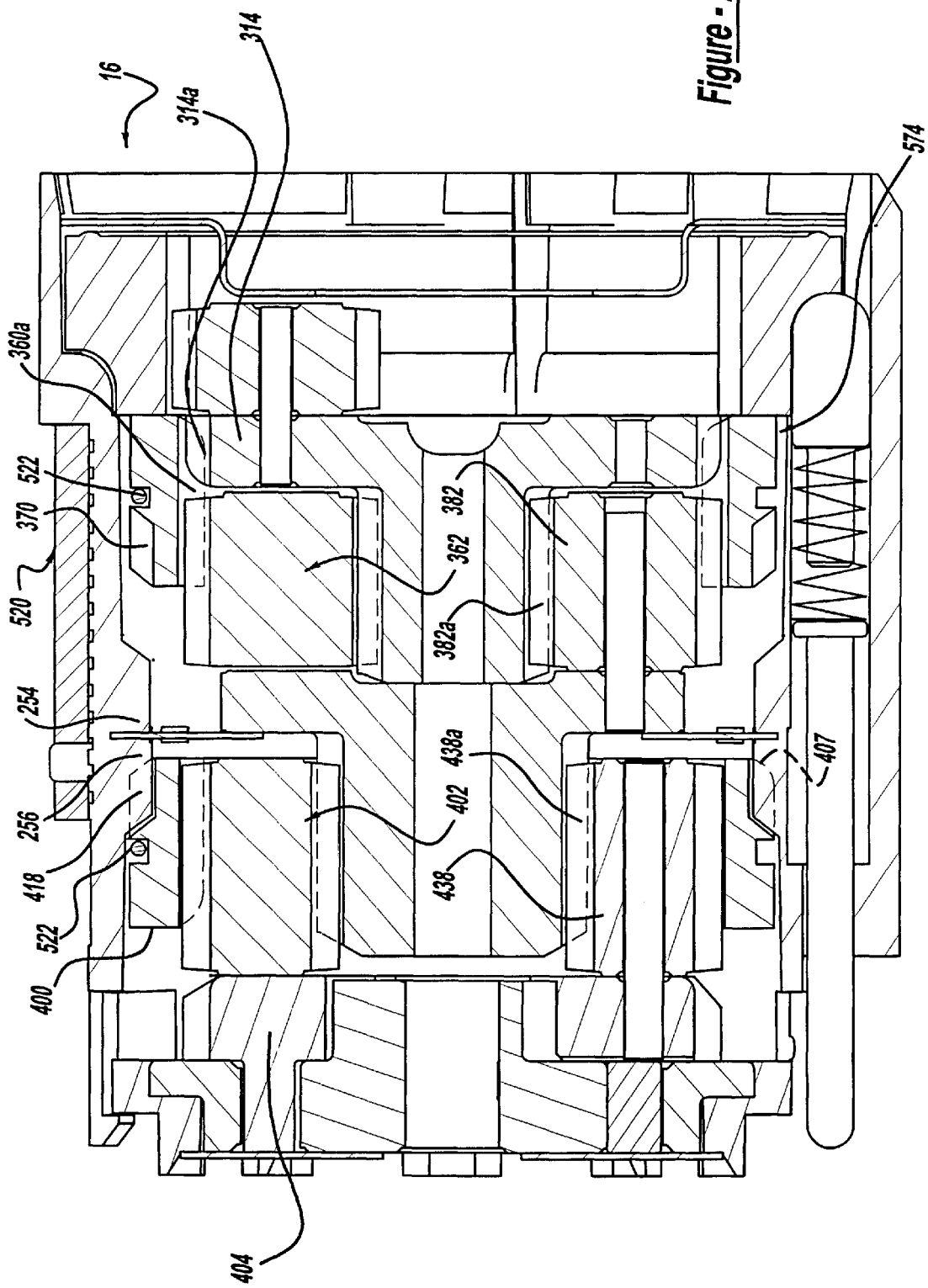
FIG. 25 is a sectional view similar to that of FIG. 23 but illustrating the transmission assembly as positioned in the third speed ratio.
Figure 26:
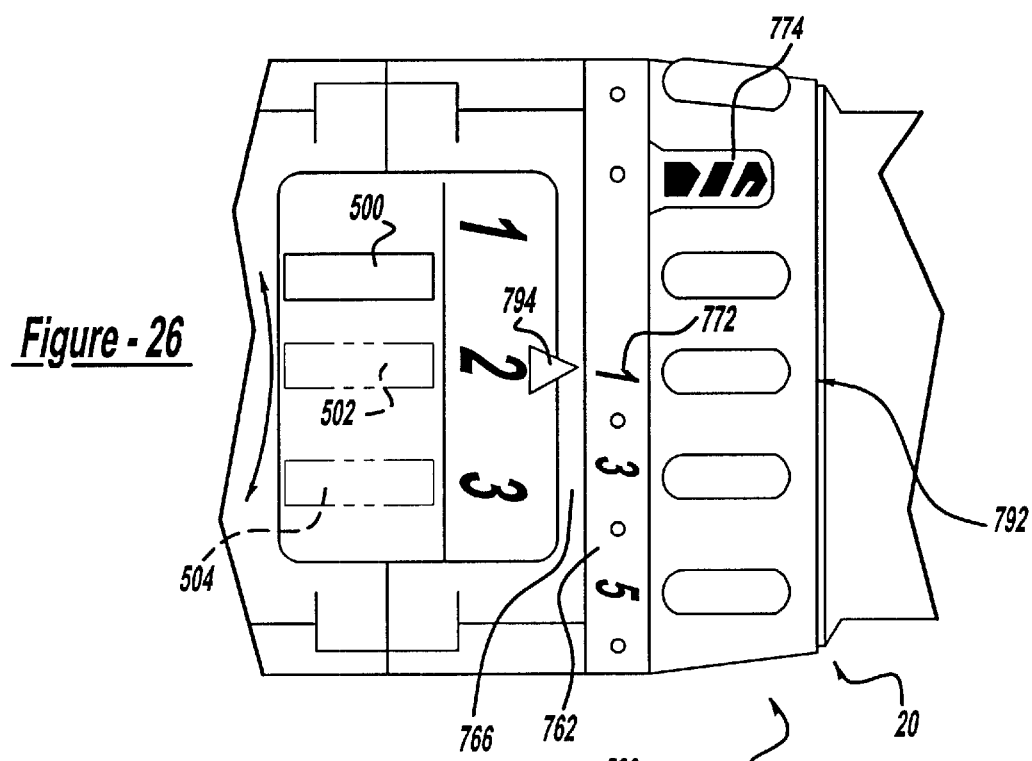
FIG. 26 is a top view of a portion of the power tool of FIG. 1 illustrating the speed selector mechanism in greater detail.

Positioning the rotary selector cam 520 in the second rotational position 502 causes the tabs 526 of the wire clip 522 that is engaged to the second ring gear 360 to be positioned in the first segment 550 of the first cam slots 540a and 540b and the tabs 526 of the wire clip 522 that is engaged to the third ring gear 400 to be positioned in the second segment 562 of the second cam slots 544a and 544b. Accordingly, positioning of the rotary selector cam 520 in second rotational position causes the second ring gear 360 to be in meshing engagement with the second planet gears 362 and the third ring gear 400 in meshing engagement with both the third planet gears 402 and the third reduction carrier 404. Positioning of the rotary selector cam 520 in the second rotational position 502 also positions the sleeve engagement teeth 370 of the second ring gear 360 in meshing engagement with the first set of ring engagement teeth 254 while the sleeve engagement teeth 418 of the third ring gear 400 are not meshingly engaged with the second set of ring engagement teeth 256. As such, relative rotation between the second ring gear 360 and the transmission sleeve 200 is inhibited, while relative rotation between the third ring gear 400 and the transmission sleeve 200 is permitted to thereby provide the transmission assembly 16 with a second overall gear reduction or speed ratio 572 as illustrated in FIG. 24.

Positioning the rotary selector cam 520 in the third rotational position 504 causes the tabs 526 of the wire clip 522 that is engaged to the second ring gear 360 to be positioned in the second segment 552 of the first cam slots 540a and 540b and the tabs 526 of the wire clip 522 that is engaged to the third ring gear 400 to be positioned in the third segment 564 of the second cam slots 544a and 544b. Accordingly, positioning of the rotary selector cam 520 in the third rotational position causes the second ring gear 360 to be in meshing engagement with both the second planet gears 362 and the first reduction carrier 314 while the third ring gear 400 in meshing engagement with only the third planet gears 402. Positioning the rotary selector cam 520 in the third rotation position 504 also positions the sleeve engagement teeth 370 on the second ring gear 360 out of meshing engagement with the first set of ring engagement teeth 254 and the sleeve engagement teeth 418 on the third ring gear 400 in meshing engagement with the second sets of ring engagement teeth 256 to inhibit relative rotation between the second ring gear 360 and the transmission sleeve 200 and permit relative rotation between the third ring gear 400 and the transmission sleeve 200 to provide the transmission assembly 16 with a third overall gear reduction or speed ratio 574.

Figure 13:
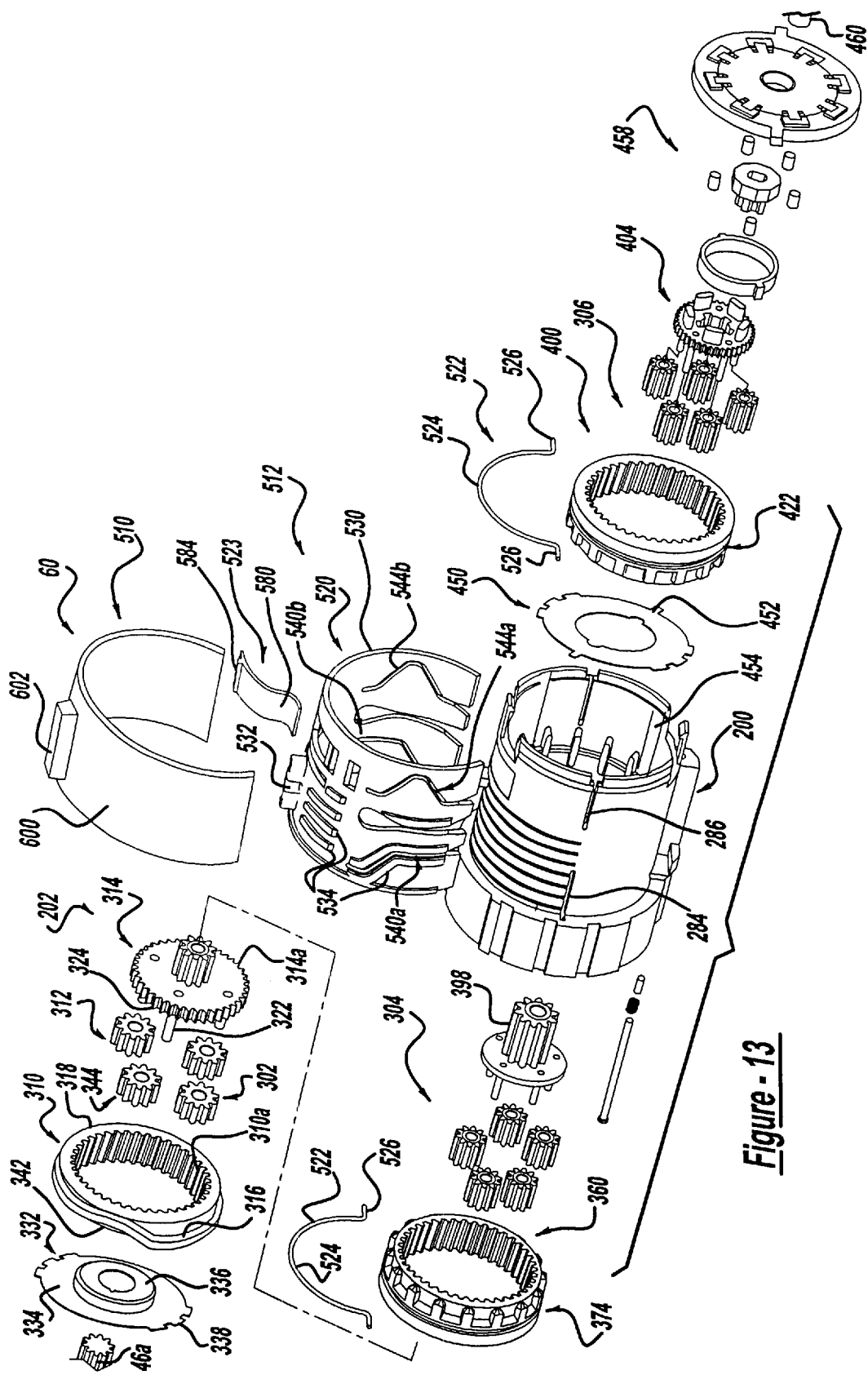
FIG. 13 is an exploded perspective view of a portion of the power tool of FIG. 1, illustrating the reduction gearset assembly, the transmission sleeve, a portion of the housing and a portion of the clutch mechanism in greater detail.
Figure 13A:
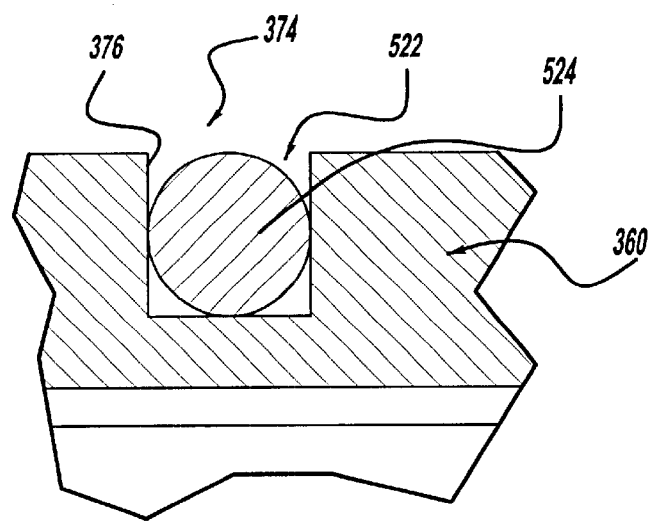
FIG. 13a is a sectional view taken along a longitudinal axis of the second ring gear.
Figure 13B:
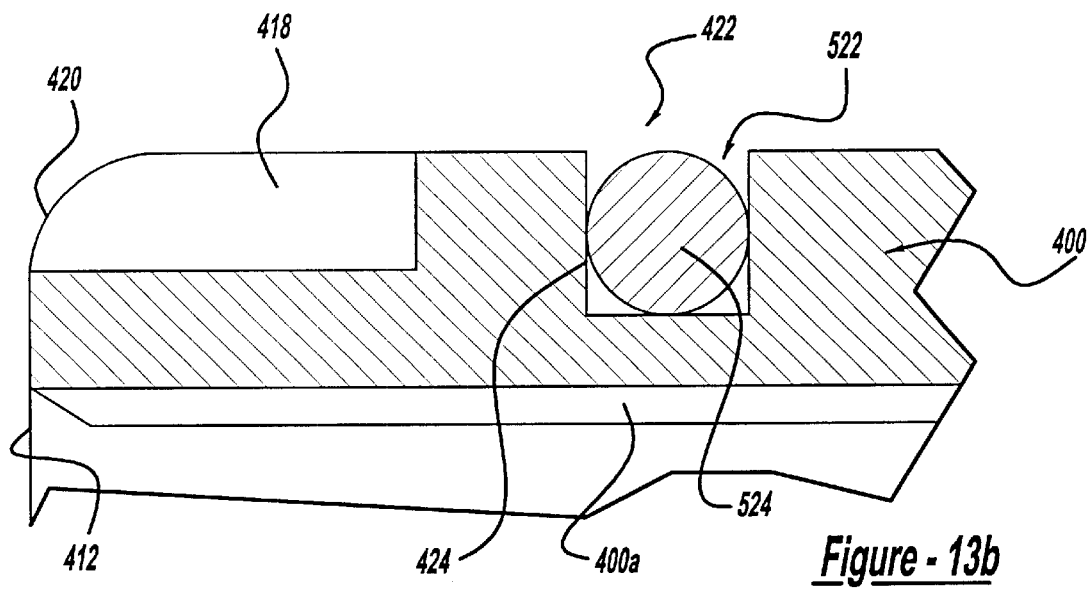
FIG. 13b is a sectional view taken along a longitudinal axis of the third ring gear.
Figure 14:
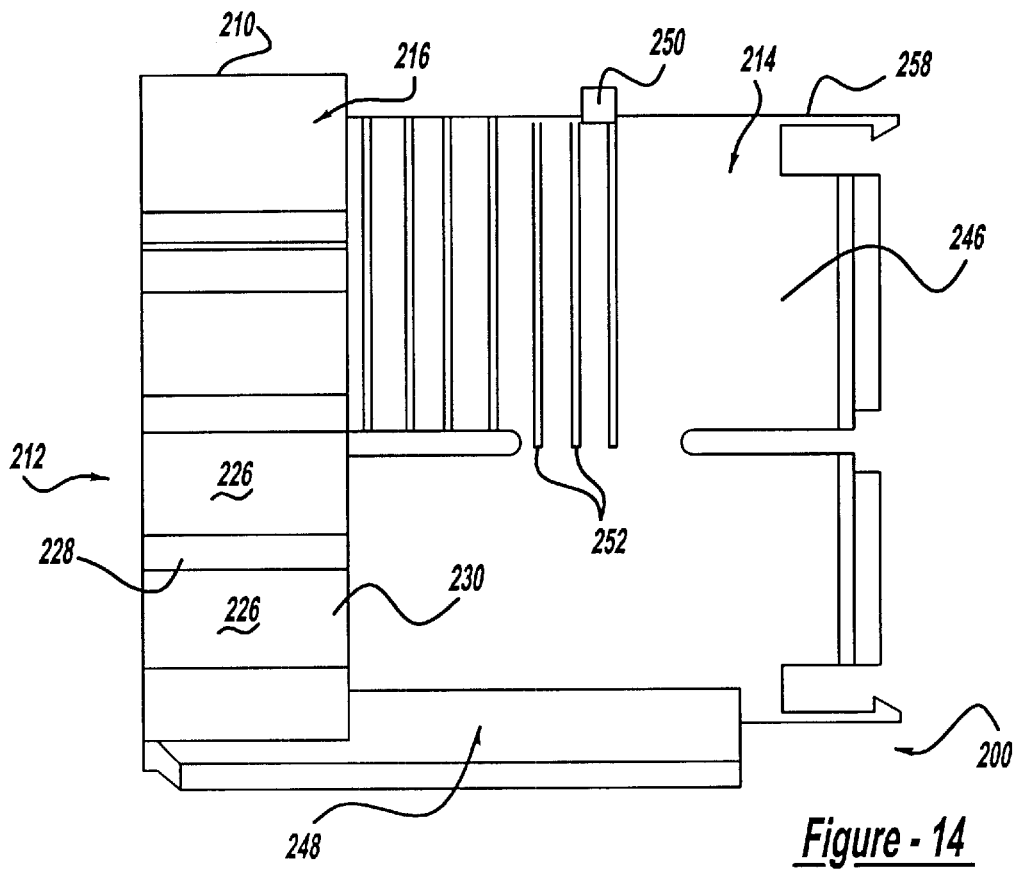
FIG. 14 is a side view of the transmission sleeve.
Figure 15:
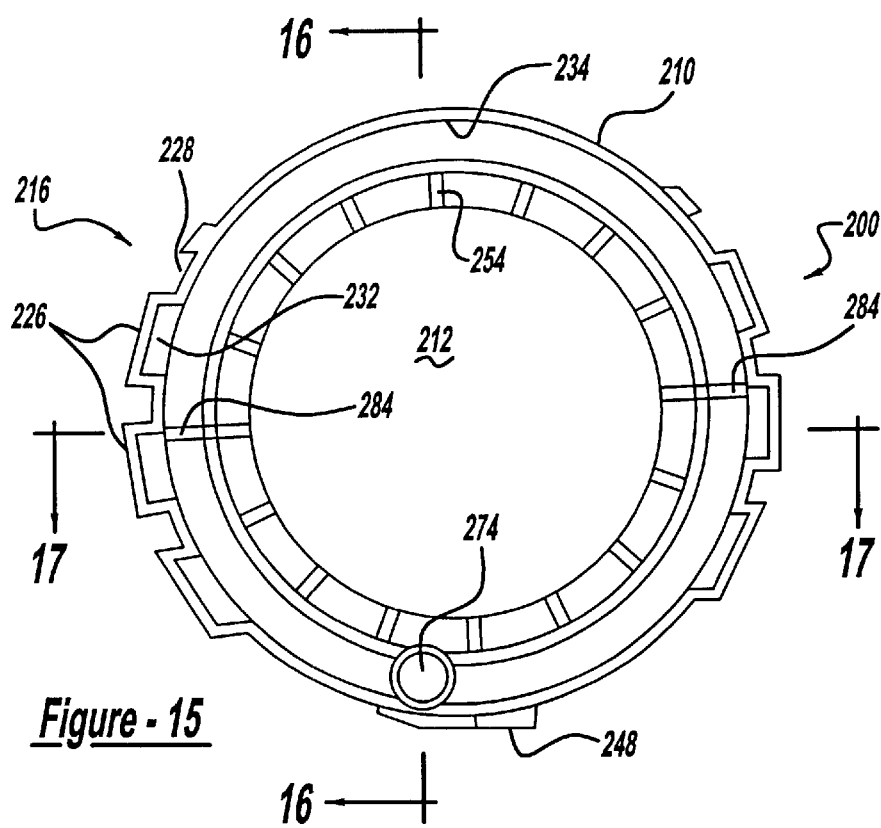
FIG. 15 is a rear view of the transmission sleeve.
Figure 16:
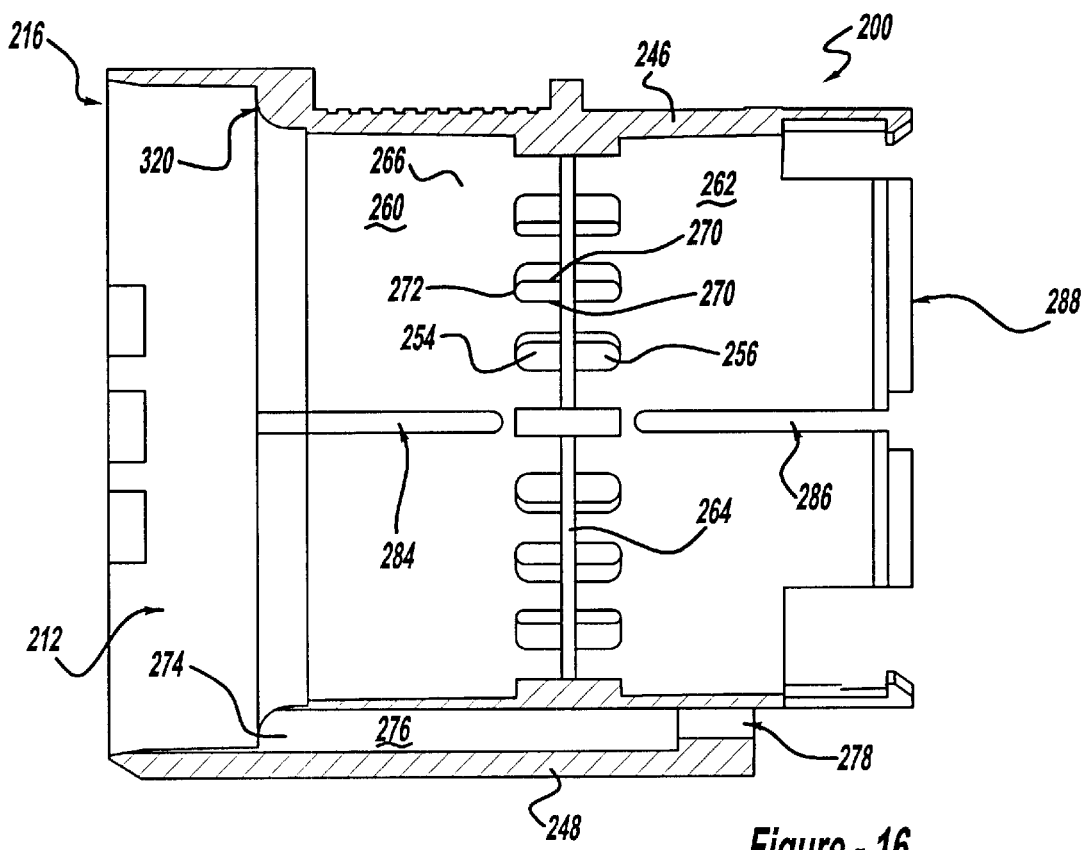
FIG. 16 is a sectional view taken along the line 16—16 of FIG. 15.
Figure 17:
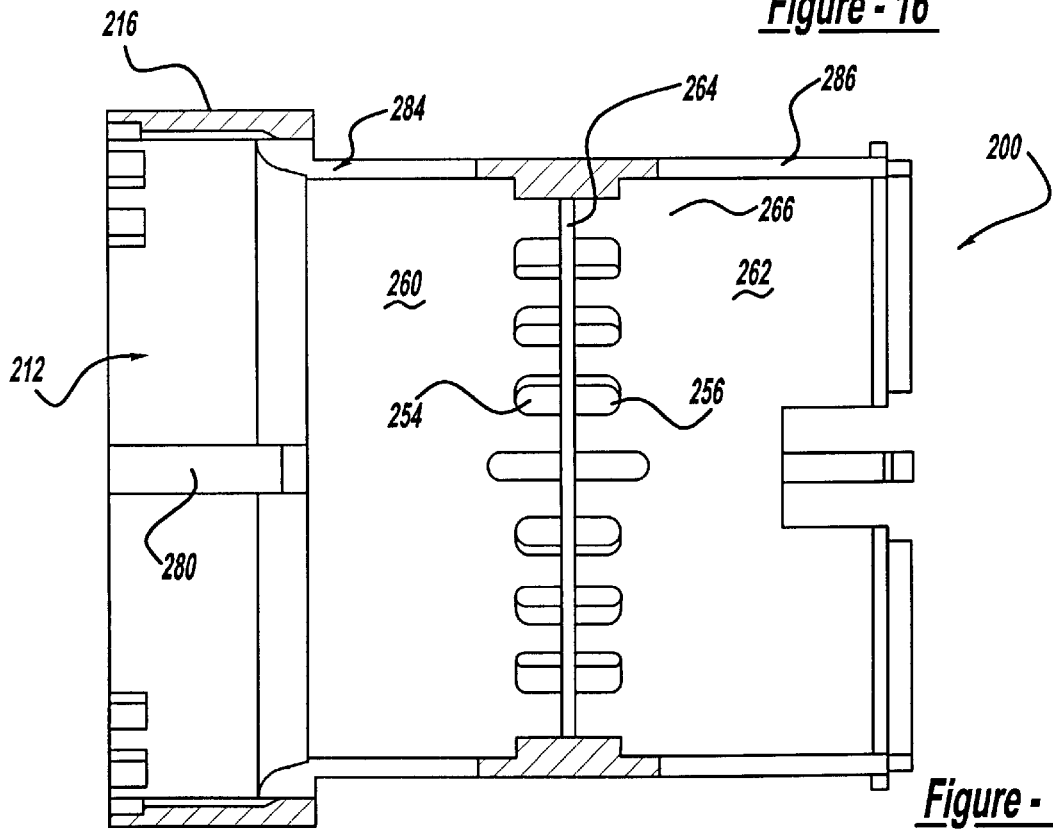
FIG. 17 is a sectional view taken along the line 17—17 of FIG. 15.
Figure 18:
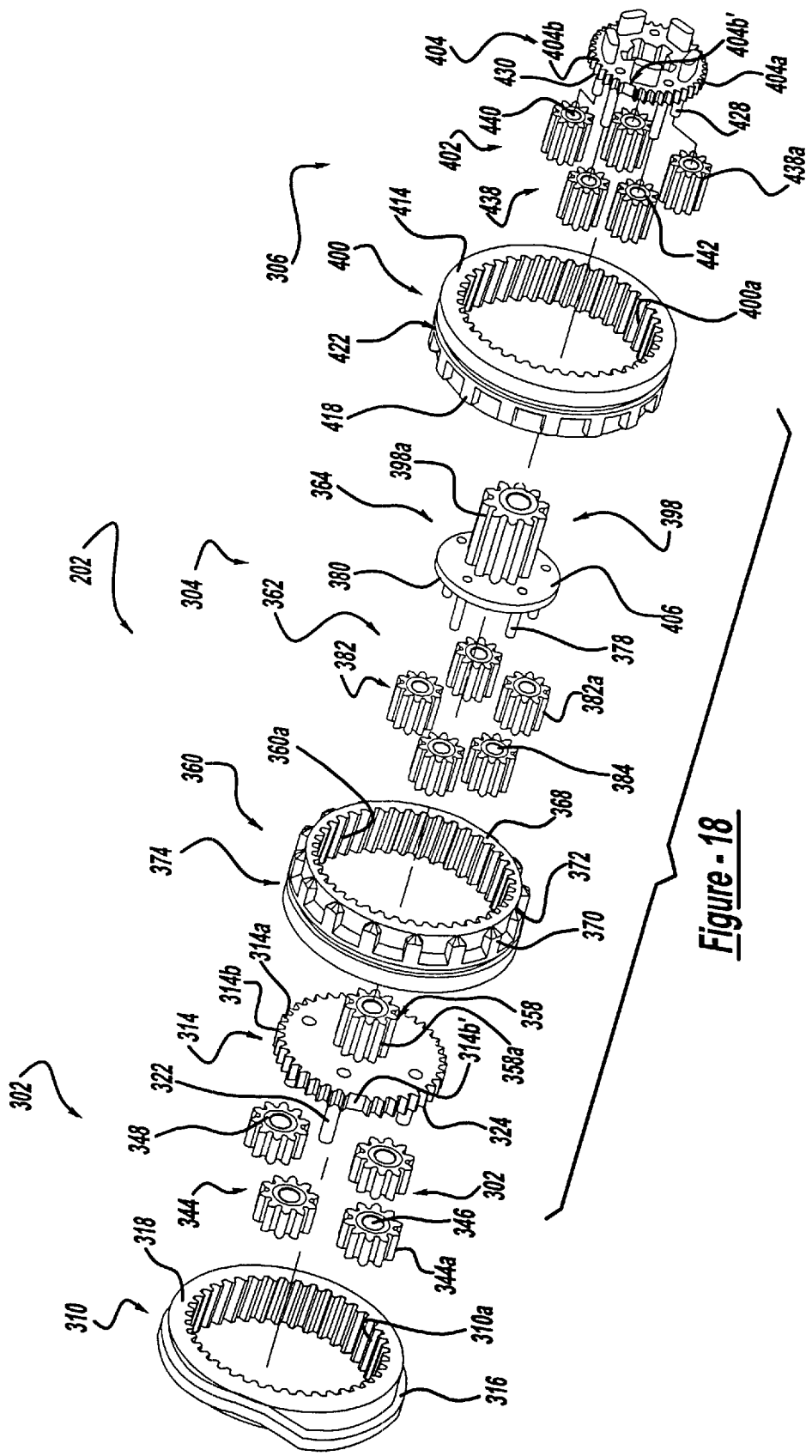
FIG. 18 is an exploded view of the reduction gearset assembly.
Figure 27A:
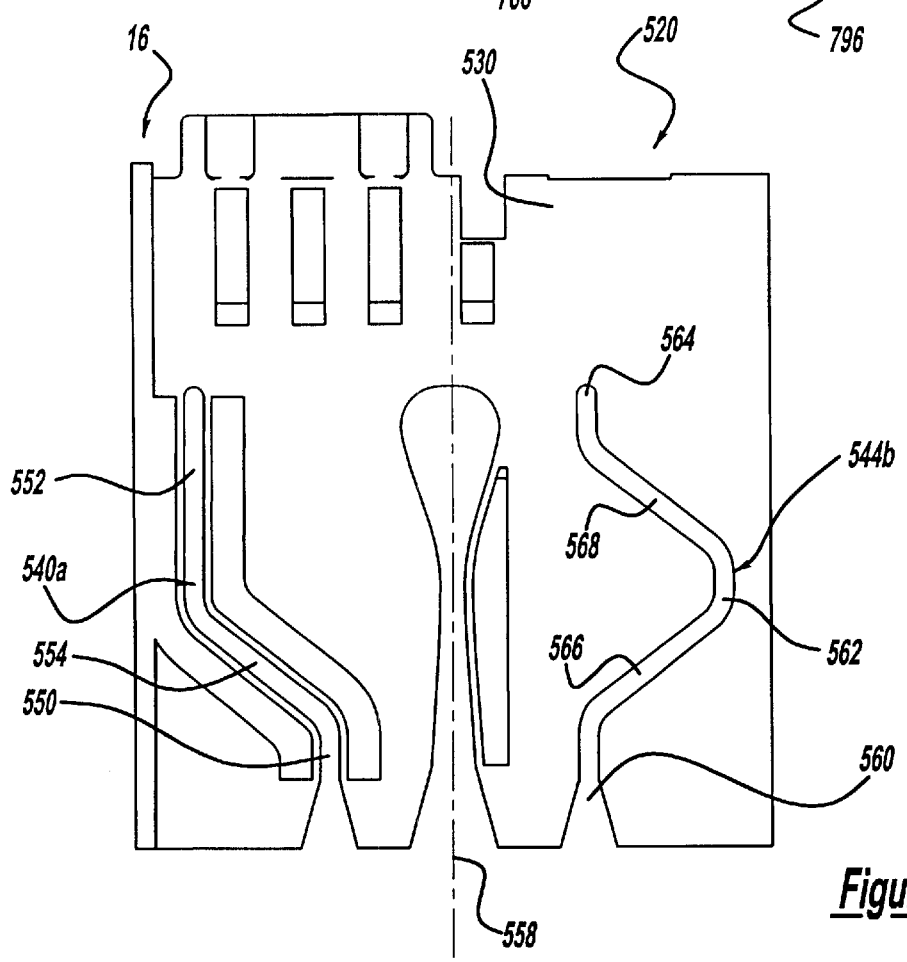
FIG. 27a is a side view of the rotary selector cam.
Figure 27B:
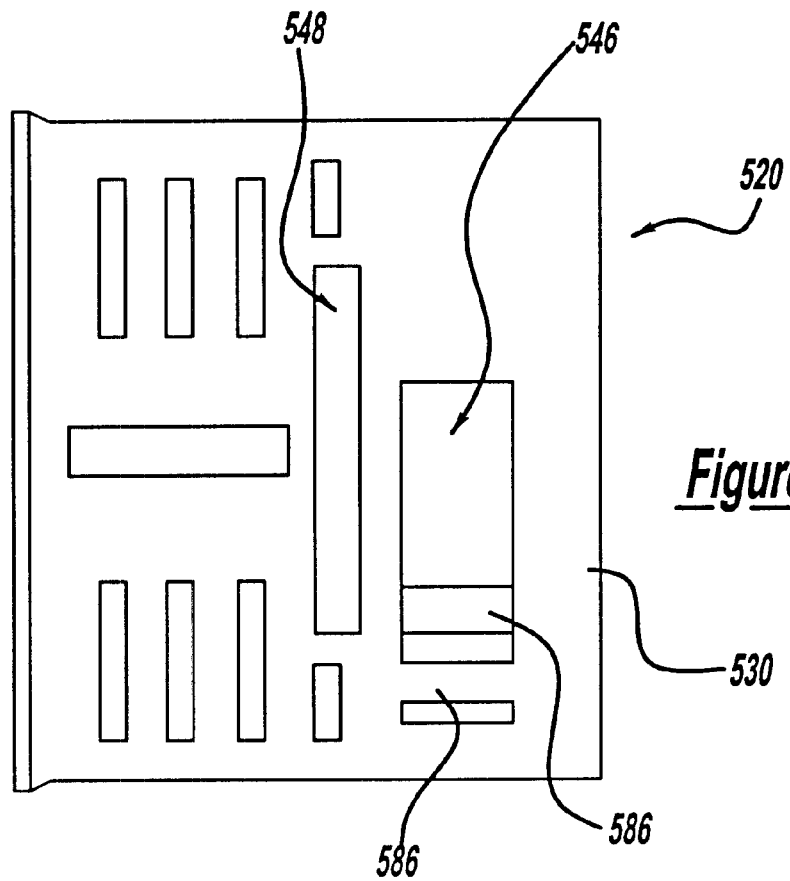
FIG. 27b is a top view of the rotary selector cam.
Figure 28:
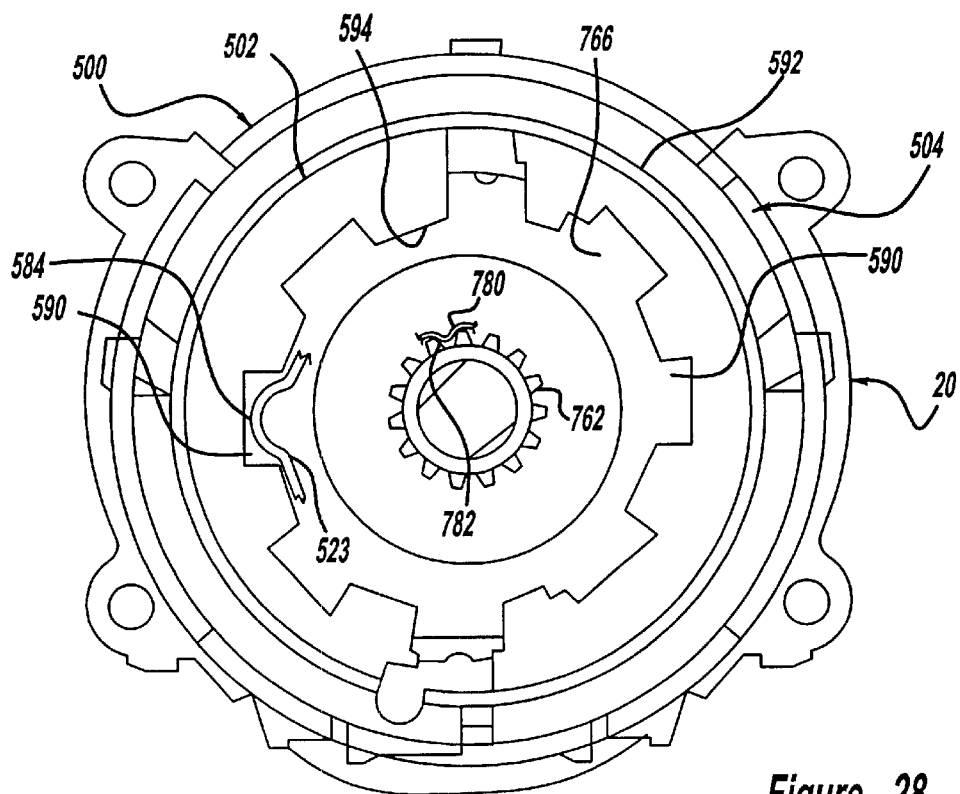
FIG. 28 is a rear view of the output spindle assembly.

In the example shown in FIGS. 13, 27b and 28, the spring member 523 is formed from a flat rectangular piece of spring steel and includes a flattened Z-shaped portion 580 and a raised portion 584. The flattened Z-shaped portion 580 is configured to wrap around two reinforcement bars 586 that extend into the spring aperture 546, thereby permitting the raised portion 584 to be maintained at a predetermined position and also to transmit a spring force between the rotary selector cam 520 and the spring member 523. With additional reference to FIG. 28, the raised portion 584 of the spring member 523 is sized to engage internal notches 590 formed in the housing 592 of the output spindle assembly 20. Lands 594 that are circumferentially spaced from the rotary selector cam 520 are formed between the notches 590. When the output spindle assembly 20 is positioned over the transmission assembly 16 and the speed selector mechanism 60 is positioned in one of the first, second and third rotational positions 500, 502 and 504, the raised portion 584 of the spring member 523 engages an associated one of the notches 590. The force that is generated by the spring member 523 when the raised portion 584 is moved downwardly toward the rotary selector cam 520 in response to contact between the raised portion 584 and the land 594 acts to inhibit unintended rotation of the speed selector mechanism 60. Furthermore, placement of the raised portion 584 in a notch 590 provides the user with a tactile indication of the positioning of the rotary selector cam 520.

Figure 27C:
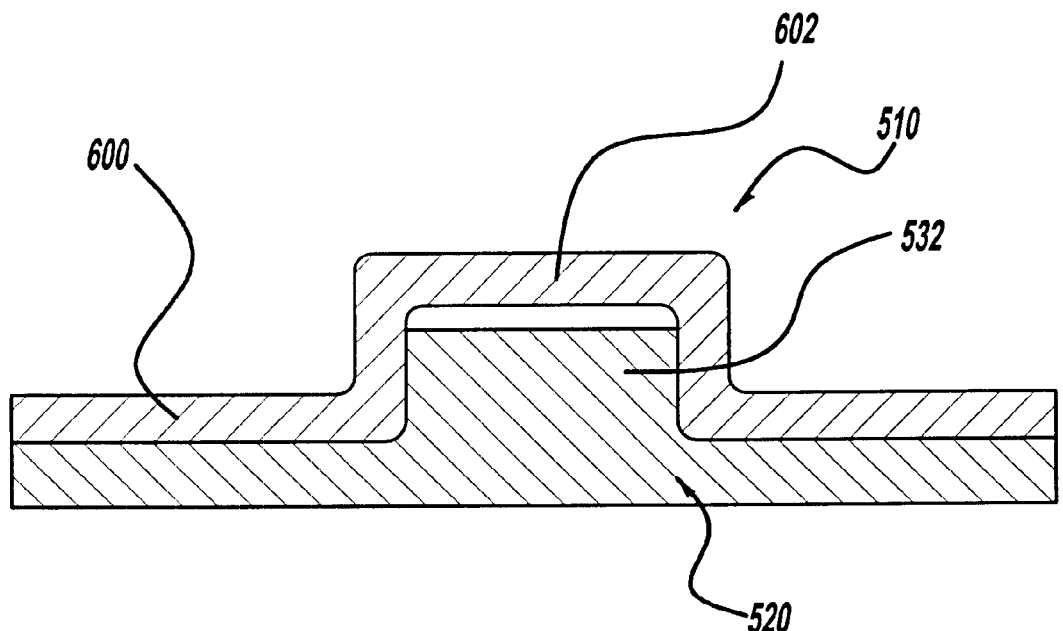
FIG. 27c is a sectional view taken through along the central axis of the speed selector mechanism.

In the particular embodiment illustrated in FIGS. 13 and 27c, switch portion 510 is shown to include an arcuate band 600 having a raised hollow and rectangular selector button 602 formed therein. The arcuate band 600 is formed from a plastic material and is configured to conform to the outer diameter of the rotary selector cam 520. The open end of the selector button 602 is configured to receive the switch tab 532, thereby permitting the switch portion 510 and the rotary selector cam 520 to be coupled to one another in a fastenerless manner. The plurality of spacing members 534 are raised portions formed into the rotary selector cam 520 that are concentric to and extend radially outwardly from the selector body 530. The spacing members 534 elevate the arcuate band 600 to prevent the arcuate band from contacting the wire tabs 526 in the first cam slots 540a and 540b. The spacing members 534 may also be employed to selectively strengthen areas of the rotary selector cam 520, such as in the areas adjacent the first cam slots 540a and 540b.

Those skilled in the art will understand that the rotary selector cam 520 (i.e., the first cam slots 540a and 540b and the second cam slots 544a and 544b) could be configured somewhat differently so as to cause the second ring gear 360 meshingly engages both the second planet gears 362 and the first reduction carrier 314 while the third ring gear 400 meshingly engages both the third planet gears 402 and the third reduction carrier 404 to thereby providing the transmission assembly 16 with a fourth overall gear reduction or speed ratio.

Those skilled in the art will also understand that selector mechanisms of other configurations may be substituted for the selector mechanism 60 illustrated herein. These selector mechanisms may include actuators that are actuated via rotary or sliding motion and may include linkages, cams or other devices that are well known in the art to slide the second and third ring gears 360 and 400 relative to the transmission sleeve 200. Those skilled in the art will also understand that as the second and third ring gears 360 and 400 are independently movable between the active and inactive modes (i.e., the placement of one of the second and third ring gears 360 and 400 does not dictate the positioning of the other one of the second and third ring gears 360 and 400), the switch mechanism 60 could also be configured to position the second and third ring gears 360 and 400 independently of one another.

Clutch Mechanism

Figure 29:
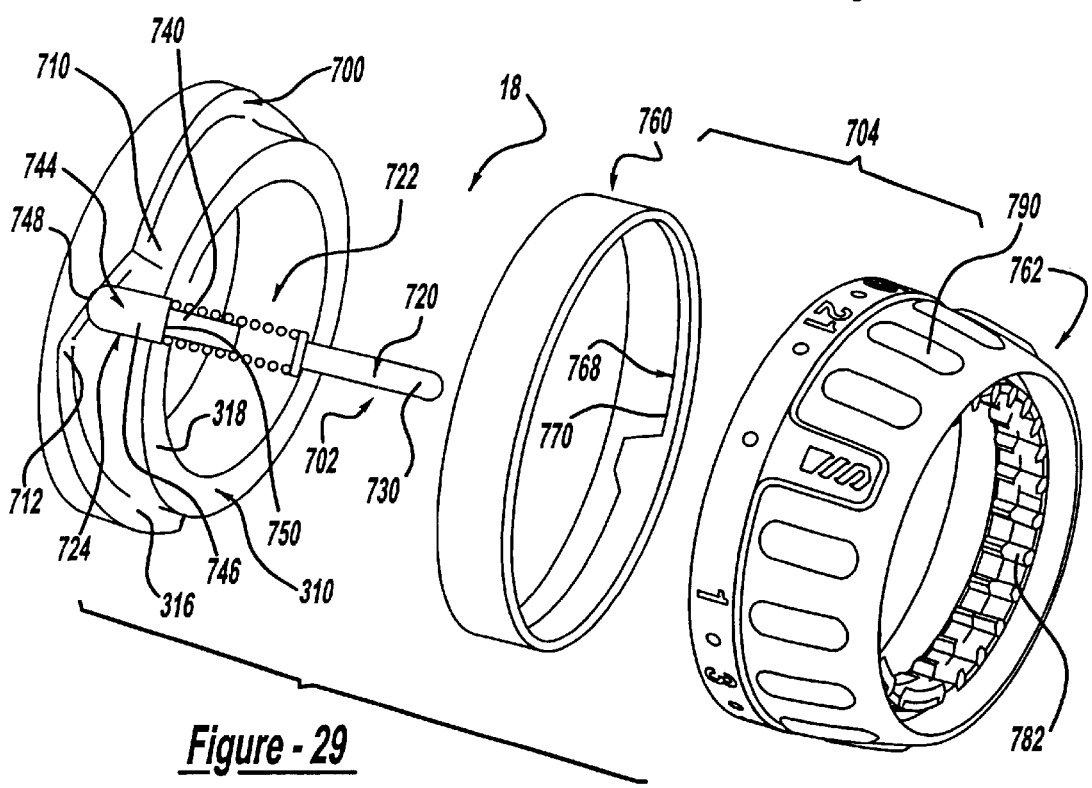
FIG. 29 is an exploded perspective view of the clutch mechanism.
Figure 29A:
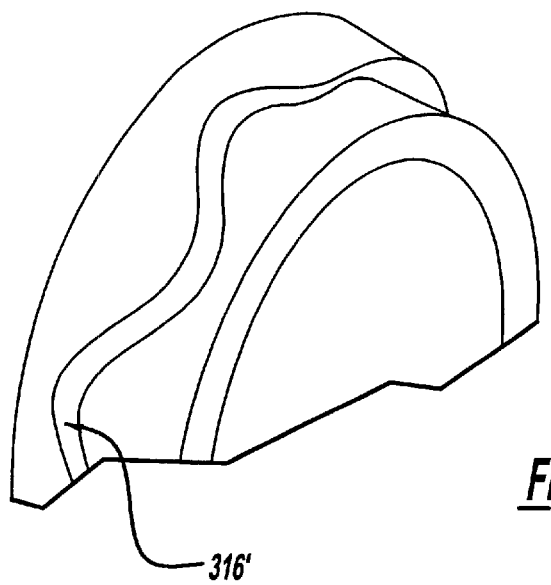
FIG. 29a is a perspective view of a portion of the clutch mechanism illustrating another configuration of the clutch member.

In FIGS. 23, 26 and 28 through 30, the clutch mechanism 18 is shown to include a clutch member 700, an engagement assembly 702 and an adjustment mechanism 704. The clutch member 700 is shown to be an annular structure that is fixed to the outer diameter of the first ring gear 310 and which extends radially outwardly therefrom. The clutch member 700 includes an arcuate clutch face 316 that is formed into the front face 318 of the first ring gear 310. The outer diameter of the clutch member 700 is sized to rotate within the portion of the hollow cavity 212 that is defined by the base 216 of the transmission sleeve 200. With specific brief reference to FIG. 29, the clutch face 316 of the example illustrated is shown to be defined by a plurality of peaks 710 and valleys 712 that are arranged relative to one another to form a series of ramps that are defined by an angle of about 18°. Those skilled in the art will understand, however, that other clutch face configurations may also be employed, such as a sinusoidally shaped clutch face 316' (FIG. 29a).

Figure 29B:
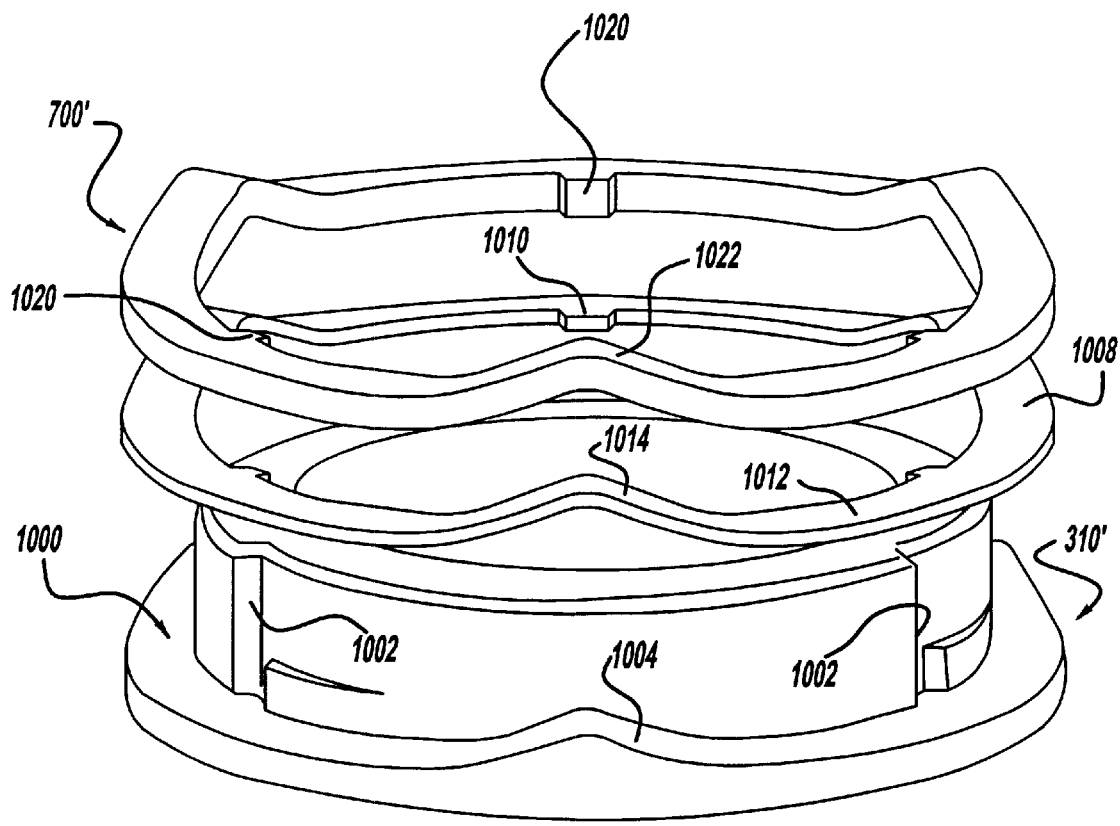
FIG. 29b is an exploded perspective view illustrating a multi-piece construction for the first ring gear and clutch member.
Figure 30:
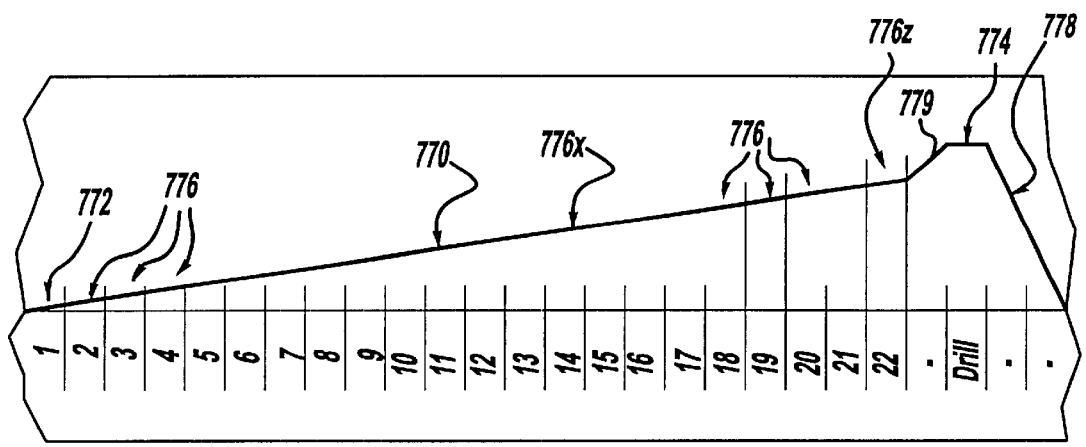
FIG. 30 is a schematic illustration of the adjustment structure in an "unwrapped" state.

While the first ring gear 310 and the clutch member 700 have been illustrated as a one piece (i.e., unitarily formed) construction, those skilled in the art will understand that they may be constructed otherwise. One such embodiment is illustrated in FIG. 29b wherein the first ring gear 310' is shown to include an annular collar 1000 and a plurality of tab apertures 1002. The annular collar 1000 is illustrated to include a plurality of ramps 1004 that have dual sloping sides, but is otherwise flat. The first ring gear 310' is otherwise identical to the first ring gear 310. An annular damper 1008 abuts the annular collar 1000 and includes a plurality of tab members 1010 that engage the tab apertures 1002 in the first ring gear 310' to prevent the damper 1008 from rotating relative to the first ring gear 310'. The damper 1008 includes a body portion 1012 that is configured to match the contour of the annular collar 1000 and as such, includes a plurality of mating ramped portions 1014 that are configured to engage each of the ramps 1004. The damper 1008 is formed from a suitable impact dampening material, such as acetyl. The clutch member 700', which is an annular member that is formed from a wear resistant material, such as hardened 8620 steel, is disposed over the damper 1008. Like the damper 1008, the clutch member 700' includes a plurality of tab members 1020, which lock into the tab apertures 1002 to prevent rotation relative to the first ring gear 310', and a plurality of mating ramped portions 1022. The mating ramped portions 1022 of the clutch member 700', however, matingly engage the mating ramped portions 1014 of the damper 1008. While the construction in this manner is more expensive relative to the previously described embodiment, it is more tolerant of high impact forces that are associated with the operation of the clutch mechanism 18.

In the particular embodiment illustrated, the engagement assembly 702 includes a pin member 720, a follower spring 722 and a follower 724. The pin member 720 includes a cylindrical body portion 730 having an outer diameter that is sized to slip-fit within the second portion 278 of the actuator aperture 274 that is formed into the pin housing portion 248 of the transmission sleeve 200. The pin member 720 also includes a tip portion 732 and a head portion 734. The tip portion 732 is configured to engage the adjustment mechanism 704 and in the example shown, is formed into the end of the body portion 730 of the pin member 720 and defined by a spherical radius. The head portion 734 is coupled to the end of the body portion 730 opposite the tip portion 732 and is shaped in the form of a flat cylinder or barrel that is sized to slip fit within the first portion 276 of the actuator aperture 274. Accordingly, the head portion 734 prevents the pin member 720 from being urged forwardly out of the actuator aperture 274.

The follower spring 722 is a compression spring whose outside diameter is sized to slip fit within the first portion 276 of the actuator aperture 274. The forward end of the follower spring 722 contacts the head portion 734 of the pin member 720, while the opposite end of the follower spring 722 contacts the follower 724. The end portion 740 of the follower 724 is cylindrical in shape and sized to slip fit within the inside diameter of the follower spring 722. In this regard, the end portion 740 of the follower acts as a spring follower to prevent the follower spring 722 from bending over when it is compressed. The follower 724 also includes a follower portion 744 having a cylindrically shaped body portion 746, a tip portion 748 and a flange portion 750. The body portion 746 is sized to slip fit within the first portion 276 of the actuator aperture 274. The tip portion 748 is configured to engage the clutch face 316 and in the example shown, is formed into the end of the body portion 746 of the follower 724 and defined by a spherical radius. The flange portion 750 is formed at the intersection between the body portion 746 and the end portion 740. The flange portion 750 is generally flat and configured to receive a biasing force that is exerted by the follower spring 722.

The adjustment mechanism 704 is also shown to include an adjustment structure 760 and a setting collar 762. The adjustment structure 760 is shaped in the form of a generally hollow cylinder that is sized to fit a housing portion 766 of the output spindle assembly 20. The adjustment structure 760 includes an annular face 768 into which an adjustment profile 770 is formed. The adjustment profile 770 includes a first adjustment segment 772, a last adjustment segment 774, a plurality of intermediate adjustment segments 776 and a ramp section 778 between the first and last adjustment segments 772 and 774. In the embodiment illustrated, a second ramp section 779 is included between the last intermediate adjustment segment 776z and the last adjustment segment 774. Also in the particular embodiment illustrated, the portion of the adjustment profile 770 from the first adjustment segment 772 through the last one of the intermediate adjustment segments 776z is formed as a ramp having a constant slope. Accordingly, a follower 780 that is coupled to the housing portion 766 of the output spindle assembly 20 is biased radially outwardly toward the inside diameter of the adjustment structure 760 where it acts against the plurality of detents 782 that are formed into the adjustment mechanism 704 (e.g., in the setting collar 762). The follower 724 and plurality of detents 782 cooperate to provide the user of tool 10 with a tactile indication of the position of the adjustment profile 770 as well as inhibit the free rotation of the adjustment structure 760 so as to maintain the position of the adjustment profile 770 at a desired one of the adjustment segments 772, 774 and 776.

The setting collar 762 is coupled to the exterior of the adjustment structure 760 and includes a plurality of raised gripping surfaces 790 that permit the user of the tool 10 to comfortably rotate both the setting collar 762 and the adjustment structure 760 to set the adjustment profile 770 at a desired one of the adjustment segments 772, 774 and 776. A setting indicator 792 is employed to indicate the position of the adjustment profile 770 relative to the housing portion 766 of the output spindle assembly 20. In the example provided, the setting indicator 792 includes an arrow 794 formed into the housing portion 766 of the output spindle assembly 20 and a scale 796 that is marked into the circumference of the setting collar 762.

During the operation of the tool 10, an initial drive torque is transmitted by the motor pinion 46 from the motor assembly 14 to the first set of planet gears 312 causing the first set of planet gears 312 to rotate. In response to the rotation of the first set of planet gears 312, a first intermediate torque is applied against the first ring gear 310. Resisting this torque is a clutch torque that is applied by the clutch mechanism 18. The clutch torque inhibits the free rotation of the first ring gear 310, causing the first intermediate torque to be applied to the first reduction carrier 314 and the remainder of the reduction gearset assembly 202 so as to multiply the first intermediate torque in a predetermined manner according to the setting of the switch mechanism 60. In this regard, the clutch mechanism 18 biases the first reduction gearset 302 in the active mode.

The magnitude of the clutch torque is dictated by the adjustment mechanism 704, and more specifically, the relative height of the adjustment segment 772, 774 or 776 that is in contact with the tip portion 732 of the pin member 720. Positioning of the adjustment mechanism 704 at a predetermined one of the adjustment segments 772, 774 or 776 pushes the pin member 720 rearwardly in the actuator aperture 274, thereby compressing the follower spring 722 and producing the a clutch force. The clutch force is transmitted to the flange portion 750 of the follower 724, causing the tip portion 748 of the follower 724 to engage the clutch face 316 and generating the clutch torque. Positioning of the tip portion 748 of the follower 724 in one of the valleys 712 in the clutch face 316 operates to inhibit rotation of the first ring gear 310 relative to the transmission sleeve 200 when the magnitude of the clutch torque exceeds the first intermediate torque. When the first intermediate torque exceeds the clutch torque, however, the first ring gear 310 is permitted to rotate relative to the transmission sleeve 200. Depending upon the configuration of the clutch face 316, rotation of the first ring gear 310 may cause the clutch force to increase a sufficient amount to resist further rotation. In such situations, the first ring gear 310 will rotate in an opposite direction when the magnitude of the first intermediate torque diminishes, permitting the tip portion 748 of the follower 724 to align in one of the valleys 712 in the clutch face 316. If rotation of the first ring gear 310 does not cause the clutch force to increase sufficiently so as to fully resist rotation of the first ring gear 310, the first reduction gearset 302 will be placed in the inactive mode wherein the first ring gear 310 will rotate so as to inhibit the transmission of the first intermediate torque to the first reduction carrier 314. In such situations, no torque will be transmitted through the portions of the transmission assembly 16 that are located forwardly of the first set of planet gears 312 (e.g., the first reduction carrier 314, the second sun gear 358, the second set of planet gears 362).

Configuration of the clutch mechanism 18 in this manner is highly advantageous in that the clutch torque is sized to resist the first intermediate torque, as opposed to the output torque of the tool 10 that is generated by the multi-reduction transmission assembly 16 and transmitted through the chuck 22. In this regard, the clutch mechanism 18 may be sized in a relatively small manner, thereby improving the ability with which it can be incorporated or packaged into the tool 10. Furthermore, as the speed or gear ratios are changed after or down stream of the first ring gear 310, the clutch mechanism 18 is operable over a relatively large span of output torques. In comparison with conventional clutch mechanisms that operate to limit the output torque of a transmission, these devices are typically operable over a relatively narrow torque band, necessitating a change in their clutch spring if a considerable shift in the magnitude of the output torque is desired. In contrast, the clutch mechanism 18 of the present invention can accommodate a considerable shift in the magnitude of the output torque of the tool 10 by simply operating the transmission assembly 16 in a different (i.e., lower or higher) gear ratio.

In the operation of rotary power tools such as tool 10, it is frequently desirable to change between two clutch settings, as when the tool 10 is used to both drill a hole and thereafter install a screw in that hole. Accordingly, the adjustment mechanism 704 may be rotated relative to the output spindle assembly 20 to position the adjustment mechanism 704 at a desired one of the adjustment segments 772, 774 and 776 to perform the first operation and thereafter rotated to a second one of the adjustment segments 772, 774 and 776 to perform the second operation. In contrast to the known clutch arrangements, the adjustment mechanism 704 of the present invention is configured such that the adjustment structure 760 and the setting collar 762 are rotatable through an angle of 360°. Assuming the adjustment structure 760 to be positioned at an intermediate adjustment segment 776*x*, rotation of the adjustment mechanism 704 through an angle of 360° would rotate the adjustment structure 760 past the other intermediate adjustment segments 776, as well as the first and last adjustment segments 772 and 774 and the ramp section 778 such that the adjustment structure 760 would again be positioned at the intermediate adjustment segment 776*x*. The feature is especially convenient when it is necessary to change the clutch setting between a relatively high clutch setting and a relatively low clutch setting. In this regard, the ramp section 778 permits the setting collar 762 (and adjustment structure 760) to be rotated from highest clutch setting, corresponding to the last adjustment segment, to the lowest clutch setting, corresponding to the first clutch setting, without positioning the clutch mechanism 18 in one of the intermediate clutch settings. Accordingly, the user of the tool 10 is able to vary the clutch setting from its maximum setting to its minimum setting (and vice versa) by rotating the setting collar 762 a relatively small amount.

Figure 31:
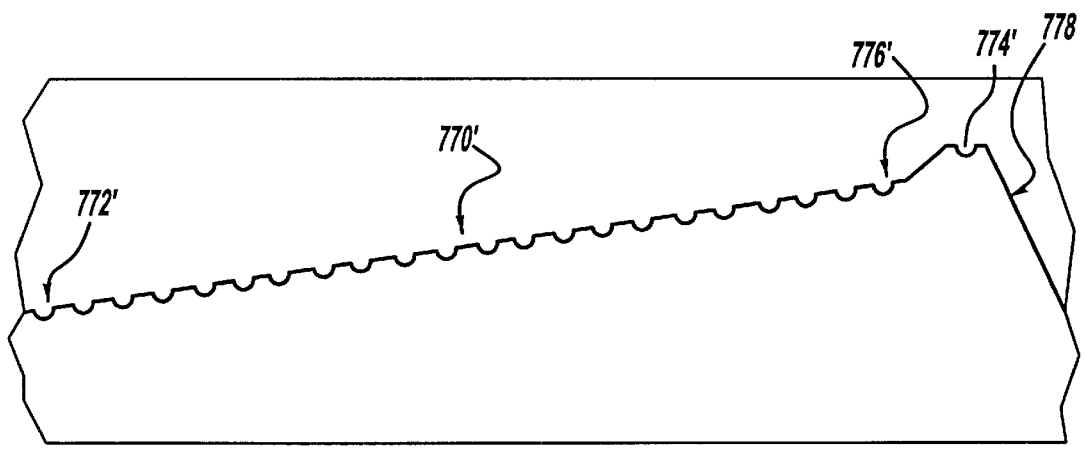
FIG. 31 is a schematic illustration similar to that of FIG. 30 but showing an alternate construction of the adjustment profile.

While the adjustment profile 770 has been described thus far as having a constant slope, those skilled in the art will appreciate that the invention, in its broader aspects, may be constructed somewhat differently. For example, the adjustment profile 770' may be formed such that each of the first, last and intermediate adjustment segments 772', 774' and 776' is detented as illustrated in FIG. 31. In this arrangement, the detents 782 in the adjustment structure 760 and the follower 780 in the housing portion 766 of the output spindle assembly 20 are unnecessary as the adjustment segments 772', 774' and 776' will cooperate with the engagement 702 to provide the user of the tool 10 with a tactile indication of the position of the adjustment profile 770', as well as inhibit the free rotation of the adjustment structure 760.

Figure 32:
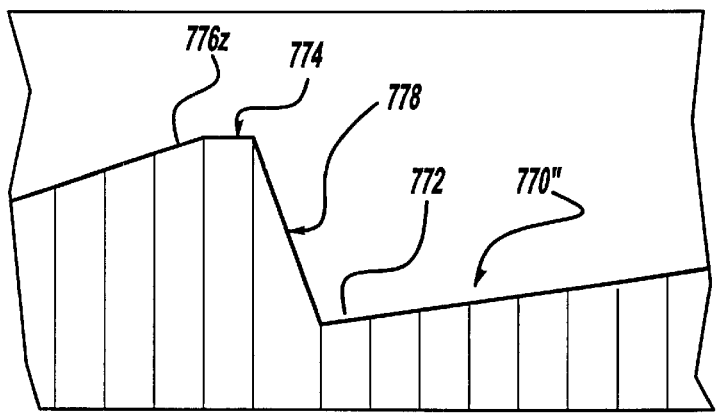
FIG. 32 is a schematic illustration similar to that of FIG. 30 but showing a portion of another alternate construction of the adjustment profile.

Another example is illustrated in FIG. 32 wherein the adjustment profile 770" is generally similar to the adjustment profile 770 except that the ramp section 779 has been omitted so that the last intermediate adjustment segment 776*z* is immediately adjacent the last adjustment segment 774.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A drive train for a power tool comprising:

a housing;

a transmission including a first reduction gear set, a second reduction gear set and a third reduction gear set, at least two of the first, second and third reduction gear sets being operable in an inactive mode and an active mode for performing a speed reduction and torque multiplication operation; and a speed selector mechanism having a switch portion and an actuator portion, the switch portion being coupled to the housing for movement between a first position, a second position and a third position, the actuator portion operatively coupled to the transmission and moving at least two of the first, second and third reduction gear sets between the active and inactive modes in response to movement of the switch portion between the first, second and third positions.

2. The drive train of claim 1, wherein the transmission is operable at a first rotational speed when the switch portion is in the first position, a second speed when the switch portion is in the second position and a third speed when the switch portion is in the third position.

3. The drive train of claim 2, wherein the speed selector mechanism moves two of the first, second and third reduction gear sets between the active and inactive modes and wherein the drive train further includes a clutch that maintains the other one of the first, second and third reduction gear sets in the active mode unless a torque exerted on the other one of the first, second and third reduction gear sets exceeds a predetermined clutch torque.

4. The drive train of claim 3, wherein the second and third reduction gear sets are the two of said first, second and third reduction gear sets, wherein the second and third reduction gear sets are active when the switch portion is in the first position, wherein the one of said second and third reduction gear sets is active and the other one of said second and third reduction gear sets is inactive when said switch portion is in the second position, and wherein both of said second and third reduction gear sets are inactive when the switch portion is in the third position.

5. The drive train of claim 1, wherein at least one of the first, second and third reduction gear sets includes a ring gear, the ring gear being movable between a first position fixed relative to the housing and a second position rotatable relative to the housing, the ring gear being positioned at the first position when the at least one of the first, second and third reduction gear sets is in the active mode, the ring gear being positioned at the second position when the at least one of the first, second and third reduction gear sets is in the inactive mode.

6. The drive train of claim 5, wherein each of the first, second and third reduction gear sets includes an associated ring gear.

7. The drive train of claim 1, wherein the switch portion is coupled to the housing for rotation between the first, second and third positions about a first axis.

8. The drive train of claim 7, wherein the first axis is a longitudinal axis of the transmission.

9. A transmission assembly for transmitting torque to an output shaft in a power tool, the transmission assembly comprising:

a housing having a wall member that defines a transmission bore;

a first transmission portion having a first input member, a first output member and a first reduction element, the first input member configured to receive a first intermediate output torque, the first output member configured to output a second intermediate output torque, the first reduction element operable in a first condition wherein the first transmission portion multiplies the first intermediate output torque by a predetermined first amount, the first reduction element further operable in a second condition wherein the first transmission portion multiplies the first intermediate output torque by a predetermined second amount; and a second transmission portion having a second input member, a second output member and a second reduction element, the second input member configured to receive the second intermediate output torque, the second output member configured to output an output torque to the output shaft, the second reduction element operable in a first condition wherein the second transmission portion multiplies the second intermediate output torque by a predetermined third amount, the second reduction element further operable in a second condition wherein the second transmission portion multiplies the second intermediate output torque by a predetermined fourth amount;

wherein the first and second reduction elements are selectively positionable to provide the transmission assembly with at least three speed ratios.

10. The transmission assembly of claim 9, wherein at least one of the first and second transmission portions is a planetary gear assembly.

11. The transmission assembly of claim 9, wherein at least one of the first and second reduction elements is a ring gear.

12. The transmission assembly of claim 11, wherein the ring gear is slidable in an axial direction that is parallel to a longitudinal axis of the transmission bore.

13. The transmission assembly of claim 12, wherein the ring gear is slidable between a first position, wherein the ring gear is fixed relative to the housing, and a second position, wherein the ring gear is rotatable within the housing.

14. The transmission assembly of claim 9, wherein the first and second reduction elements are independently movable between their first and second conditions.

15. The transmission assembly of claim 9, wherein the first intermediate torque output is provided by another portion of the transmission assembly.

16. The transmission assembly of claim 15, further comprising a third transmission portion having a third input member, a third output member and a third reduction element, the third input member configured to receive an input torque, the third output member configured to output the first intermediate output torque, the third reduction element operable in a first condition wherein the third reduction element is fixed relative to the housing to permit the third transmission portion to multiply the input torque by a fifth predetermined amount.

17. The transmission assembly of claim 16, wherein the third reduction element is further operable in a second condition wherein the third reduction element is movable relative to the housing to inhibit the third transmission portion from multiplying the input torque by the fifth predetermined amount.

18. The transmission assembly of claim 17, further comprising a clutch assembly having an annular flange and an engagement assembly, the annular flange coupled to one of the first, second and third reduction elements and having a predetermined clutch profile, the engagement assembly having a follower member, the follower member abutting the annular flange and cooperating with the clutch profile to inhibit relative rotation between the annular flange and the follower member when a torque is applied to the one the first, second and third reduction elements having a magnitude that is less than a predetermined maximum torque.

19. A power tool comprising:
a housing having a wall member that defines a transmission bore; and
a transmission having a first planetary gear set and a second planetary gear set:
the first planetary gear set including a first ring gear, a first sun gear and a first planet gear assembly, the first planet gear assembly having a first planet carrier and a plurality of first planet gears, the first planet carrier having an output sun gear and a plurality of pinions for rotatably supporting the plurality of first planet gears, the first sun gear configured to receive a first intermediate output torque, the output sun gear configured to output a second intermediate output torque, the plurality of first planet gears meshingly engaged with the first sun gear and the first ring gear, the first ring gear axially positionable in a first condition wherein the first ring gear is fixed relative to the housing to prevent relative rotation therebetween, the first ring gear also axially positionable in a second condition wherein the first ring gear is rotatable within the transmission bore; and
the second planetary gear set including a second ring gear and a second planet gear assembly, the second planet gear assembly having a second planet carrier and a plurality of second planet gears, the second planet carrier having an output member and a plurality of pinions for rotatably supporting the plurality of second planet gears, the plurality of second planet gears meshingly engaged with the second ring gear and the output sun gear and configured to receive the second intermediate output torque, the output member configured to output an output torque, the second ring gear axially positionable in a first condition wherein the second ring gear is fixed relative to the housing to prevent relative rotation therebetween, the second ring gear also axially positionable in a second condition wherein the second ring gear is rotatable within the transmission bore;
wherein each of the first and second ring gears is selectively positionable in the first and second conditions to provide the power tool with at least three operating speeds.

20. The power tool of claim 19, wherein the first and second ring gears are independently movable between their first and second conditions.

21. The power tool of claim 19, wherein the transmission further comprises a third planetary gear set having a third ring gear, a third sun gear and a third planet gear assembly, the third planet gear assembly having a third planet carrier and a plurality of third planet gears, the third planet carrier rotatably coupled to the first sun gear, the third planet carrier having a plurality of pinions for rotatably supporting the plurality of third planet gears, the third sun gear adapted to receive an input torque, the third planet carrier adapted to transmit the first intermediate output torque to the first sun gear, the plurality of third planet gears meshingly engaged with the third sun gear and the third ring gear, the third ring gear axially positionable in a first condition wherein the third ring gear is fixed relative to the housing.

22. The power tool of claim 21, wherein the third planet gear reduction element is further operable in a second condition wherein the third ring gear is rotatable within the housing.

23. The power tool of claim 22, further comprising a clutch assembly having an annular flange and an engagement structure, the annular flange coupled to one of the first, second and third ring gears and having a predetermined clutch profile, the engagement structure having a follower member, the follower member abutting the annular flange and cooperating with the clutch profile to inhibit relative rotation between the annular flange and the follower member when a torque is applied to the one the first, second and third ring gears having a magnitude that is less than a predetermined maximum torque.

24. The power tool of claim 23, further comprising a switching assembly for coordinating the axial sliding movement of the first and second ring gears.

25. A power tool comprising:

a motor having an output shaft, the motor producing an input torque;

a transmission assembly having a housing and a transmission, the housing having a wall member that defines a transmission bore, the transmission having a first planetary gear set, a second planetary gear set and a third planetary gearset, the first planetary gear set having a first ring gear, a first sun gear and a first planet gear assembly, the first planet gear assembly having a first planet carrier and a plurality of first planet gears, the first planet carrier rotatably coupled to the first sun gear, the first planet carrier having a plurality of pinions for rotatably supporting the plurality of first planet gears, the first sun gear configured to receive the input torque, the first planet carrier including a second sun gear and being configured to transmit the first intermediate output torque to the second planetary gear set, the plurality of first planet gears meshingly engaged with the second sun gear and the first ring gear, the first ring gear axially positionable in a first condition wherein the first ring gear is fixed relative to the housing, the second planetary gear set including a second ring gear and a second planet gear assembly, the second planet gear assembly having a second planet carrier and a plurality of second planet gears, the second planet carrier having an output sun gear a plurality of pinions for rotatably supporting the plurality of second planet gears, the second sun gear meshingly engaged with the plurality of second plane gears and transmitting the first intermediate output torque thereto, the output sun gear adapted to output a second intermediate output torque, the plurality of second planet gears also being meshingly engaged with the second ring gear, the second ring gear axially positionable in a first condition wherein the second ring gear is fixed relative to the housing to prevent relative rotation therebetween, the second ring gear also axially positionable in a second condition wherein the second ring gear is rotatable within the transmission bore, the third planetary gear set including a third ring gear and a third planet gear assembly, the third planet gear assembly having a third planet carrier and a plurality of third planet gears, the third planet carrier having an output member and a plurality of pinions for rotatably supporting the plurality of third planet gears, the plurality of third planet gears meshingly engaged with the third ring gear and the output sun gear and configured to receive the second intermediate output torque, the output member adapted to output an output torque, the third ring gear axially positionable in a first condition wherein the third ring gear is fixed relative to the housing to prevent relative rotation therebetween, the third ring gear also being axially positionable in a second condition wherein the third ring gear is rotatable within the transmission bore, wherein each of the second and third ring gears is selectively positionable in the first and second conditions to provide the power tool with at least three operating speeds.

26. The power tool of claim 25, wherein the first ring gear is further operable in a second condition wherein the first ring gear is rotatable relative to the housing.

27. The power tool of claim 25, wherein the transmission assembly further comprises a clutch assembly having an annular flange and an engagement assembly, the annular flange coupled to one of the first, second and third ring gears and having a predetermined clutch profile, the engagement assembly having a follower member, the follower member abutting the annular flange and cooperating with the clutch profile to inhibit relative rotation between the annular flange and the follower member when a torque is applied to the one the first, second and third ring gears having a magnitude that is less than a predetermined maximum torque.

28. The power tool of claim 27, further comprising a switching assembly for coordinating the axial sliding movement of the second and third ring gears.

* * * * *